US007046688B2

(12) United States Patent
Amou et al.

(10) Patent No.: US 7,046,688 B2
(45) Date of Patent: May 16, 2006

(54) PACKET SCHEDULER

(75) Inventors: Kensaku Amou, Kawasaki (JP);
Tetsumei Tsuruoka, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 923 days.

(21) Appl. No.: 09/947,789

(22) Filed: Sep. 7, 2001

(65) Prior Publication Data

US 2002/0097734 A1 Jul. 25, 2002

(30) Foreign Application Priority Data

Jan. 23, 2001 (JP) ............................. 2001-015108

(51) Int. Cl.
H04L 12/56 (2006.01)

(52) U.S. Cl. .................. 370/418; 370/412; 370/413; 370/414; 370/415; 370/416; 370/417; 370/395.4; 370/395.41; 370/395.42; 370/395.43

(58) Field of Classification Search ............... 370/418, 370/412, 413, 414, 415, 416, 417, 395.4, 370/395.41, 395.42, 395.43
See application file for complete search history.

(56) References Cited

U.S. PATENT DOCUMENTS 6,064,676 A * 5/2000 Slattery et al. ............. 370/412

6,408,005 B1 * 6/2002 Fan et al. .................... 370/412
6,469,983 B1 * 10/2002 Narayana et al. ........... 370/231
2005/0058149 A1 * 3/2005 Howe ......................... 370/428

FOREIGN PATENT DOCUMENTS

JP 9083525 3/1997
JP 10336224 12/1998

* cited by examiner

Primary Examiner—Ricky Q. Ngo
Assistant Examiner—Kevin Mew
(74) Attorney, Agent, or Firm—Katten Muchin Rosenman LLP

(57) ABSTRACT

There is provided a packet scheduler for managing output awaiting packets stored in a plural of queue blocks each having a weighting coefficient settled based on an output guaranteeing bandwidth, whereby an output order for the head packets is stored in respective queue blocks. The packet scheduler includes means for controlling selection of a queue having a packet to be sent at the highest priority, based on scheduled output time information obtained by calculation using management information of the output awaiting packets and the weighting coefficient of each queue, and means for correcting processing carried out in the controlling means based on the current time information. The arrangement enables to ensure assignment of vacant bandwidth in a fair manner while suppressing erroneous operation deriving from deviation of a scheduled packet output time from the real time caused by a calculation error or the like in WFQ calculation.

9 Claims, 21 Drawing Sheets

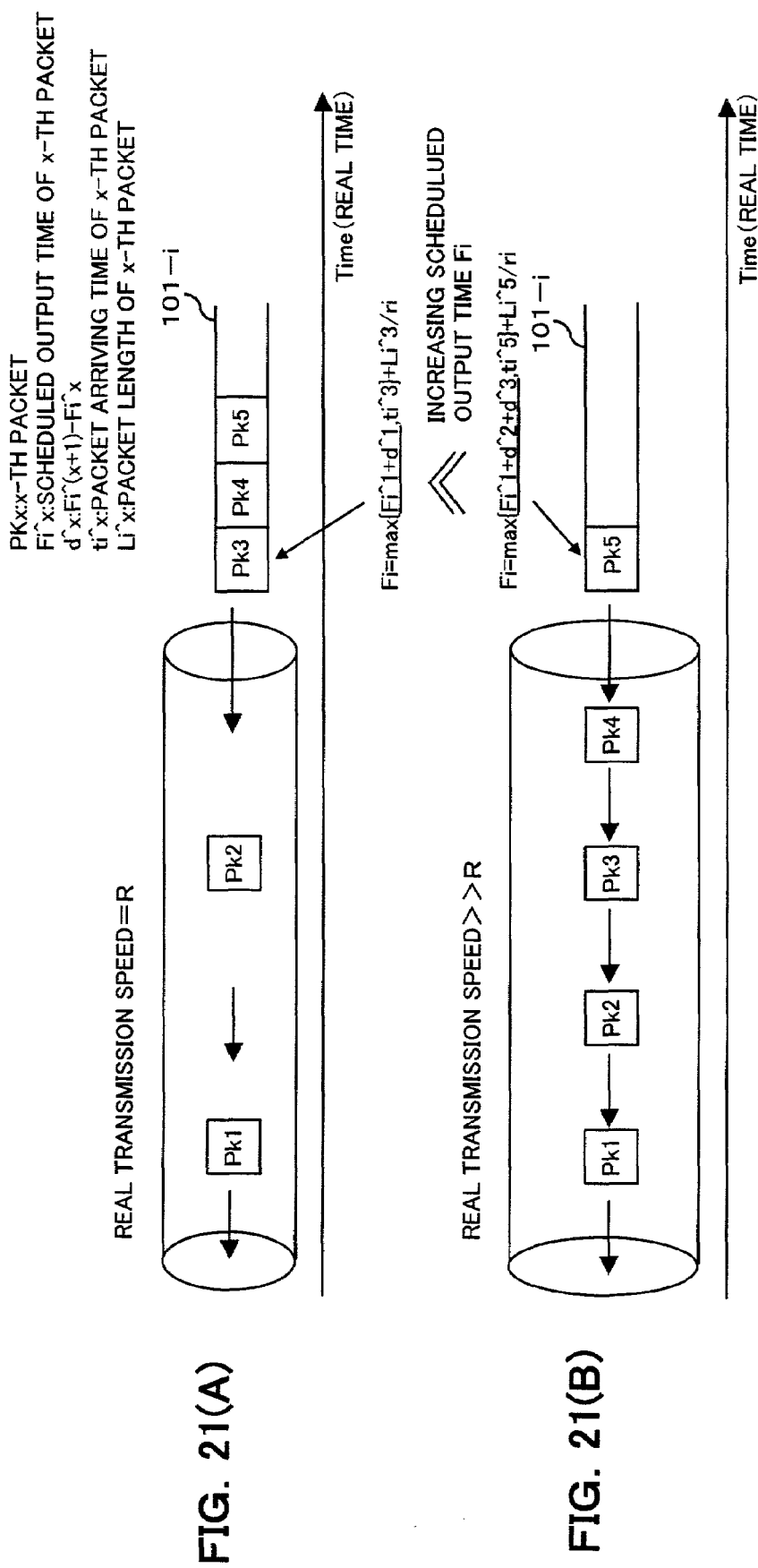

PACKET SCHEDULER

BACKGROUND OF THE INVENTION

1) Field of the Invention

The present invention relates to a packet scheduler, and more particularly to a packet scheduler suitably useful in a case where a packet transfer apparatus such as a router carries out packet scheduling by using a manner of WFQ (Weighted Fair Queuing).

2) Description of the Related Art

Recently, a multimedia information communication using a network and an application for carrying out communication in a real time manner are deployed. With the deployment of the mode of utilization of the network, it is requested that the communication quality provided by the network is more firmly guaranteed and improved.

Technology of IP (Internet Protocol) and one regarding ATM (Asynchronous Transfer Mode) are technologies which support the above-introduced applications. In a router as a network relaying apparatus (packet transferring apparatus) having the technology of IP and one regarding ATM, a requested implementation of a packet scheduling is one in which packets are classified into a plurality of queues in accordance with the traffic and transferring control is effected while the requested communication quality is guaranteed.

In order to provide the communication quality requested for the network, a transmission bandwidth may be reserved for guaranteeing the bandwidth for the traffic. In this case, it is necessary for the packet transmitting apparatus to reserve a bandwidth for each traffic and transmit a packet so that the reserved bandwidth is guaranteed.

If the packet transmitting apparatus is requested as described above, the packet transmitting apparatus shall be arranged based on a packet scheduling system in which a queue block composed of a memory or the like of a FIFO (First-In First-Out) system is prepared for each traffic independently so that the bandwidth reserved for each traffic is guaranteed and output order is decided for the packets held in the queue for each traffic. As a packet scheduling system as described above, an algorithm based on WFQ (Weighted Fair Queuing) is well known. The technology of WFQ is described in a reference of, for example, A. K. Parekh and R. G. Gallager, "A Generalized Processor Sharing Approach to Flow Control in Integrated Service Networks: The Single-Node Case", IEEE/ACM Trans. on Networking, vol.1, pp. 344–357, June 1993.

FIG. 19 is a diagram illustrative of a packet transferring technology based on a conventional WFQ algorithm implemented in a packet transferring apparatus provided on the above-described network. As shown in FIG. 19, reference numerals 101-1 to 101-n represent queue blocks, 102 a packet scheduler for deciding an output order of packets held in each of the queues 101-1 to 101-n.

In FIG. 19, packets of each traffic tr1 to trn are stored in respective queue blocks 101-1 to 101-n, and the packets stored in respective queue blocks 101-1 to 101-n are outputted in a manner of FIFO system. Also, the queue 101-i (i; 1 to n) is arranged to have a weighting coefficient $\phi_i$ in proportion to a reserved bandwidth. When any packet to be transmitted is stored in the queue block, the queue block is referred to as one placed in a back-log state or "active". Now symbol $\phi_b$ is taken as a sum of the weighting coefficients of queue blocks in the back-log state.

According to the arrangement of the packet scheduler 102 shown in FIG. 19, in consideration of a fair assignment of a vacant bandwidth of a queue block which is placed in a non-active state, the scheduled output time of the head packet (packet to be outputted first) of each queue block (e.g., a value of Fi of the queue block 101-i) is calculated based on the following Equations (1) and (2), and a queue block holding a packet to be outputted at the highest priority is selected in accordance with the obtained scheduled output times of the head packets of respective queue blocks 101-1 to 101-n.

In this case, "ri" represents a value of a vacant bandwidth assigned to a bandwidth which is reserved for a traffic "tri" of the queue block 101-i, "ti" arrival time data indicative of a timing point when the head packet arrived at the queue block and held in the queue block 101-i, "Li" a length of the head packet, "R" a transmission speed of an output link, and "F'i" data of scheduled output time calculated when a packet is outputted last from the queue block 101-i. In order to guarantee a reserved bandwidth for all of the queues, Equation, $R \geq \Sigma \phi_i$ shall hold.

$$ri = \phi_i \times R/\phi \quad (1)$$

$$Fi = \max\{F'i, ti\} + Li/ri \quad (2)$$

That is, as shown in FIG. 20, the first term of Equation (2), or $\max\{F'i, ti\}$ means that a larger value (later time) is selected as a calculation reference from the scheduled output time F'i of the head packet last outputted from the queue block 101-i and the arrival time ti of a packet sequel to the head packet in the same queue block 101-i. The second term of the same equation, Li/ri represents a transfer time required when a packet with a packet length of Li is transmitted in the reserved bandwidth ri.

In other words, the first term, $\max\{F'i, ti\}$ means that time information serving as a calculation reference of the scheduled output time of the head packet is set to F'i or ti in accordance with the comparison between them. For example, if a packet arrives at the subject queue block 101-i soon after the last packet is outputted from this queue block, ti becomes a later time with respect to F'i. Thus, time of ti is employed as the calculation reference. Conversely, as shown in FIG. 20, if a packet arrives at the subject queue block 101-i before the packet to be outputted first is outputted from this queue block, F'i becomes a later time with respect to ti. Thus, time of F'i is employed as the calculation reference.

As described above, the packet scheduler 102 selects a queue block 101-i placed in the active state having the minimum Fi value as a packet to be outputted first, based on the comparison among Fi values calculated as described above. Then, the packet scheduler 102 provides instruction to the queue block 101-i that the head packet thereof is to be outputted.

When the scheduled output time Fi for the head packet of the selected queue block 101-i is decided, this value is utilized for calculating a value of F'i, or the scheduled output time value for a packet to be outputted next. In this way, in the packet scheduler 102, the value of Fi is subjected to an incrementing processing at every operation of packet selection. In other words, each time a single packet is selected and outputted to the network, calculation of Fi based on the new condition (using Equations (1) and (2)) is effected so as to carry out packet selection processing.

In the above-described packet transferring apparatus to which the WFQ algorithm is applied, each variable utilized in the calculation of Equations (1) and (2) is denoted by a limited number of bit length. Also, the packet arriving time counted by a timer or the like is denoted by a value of a limited number of bit length.

In the above-described conventional WFQ algorithm, however, if the above-described deviation of the scheduled output time Fi from an actual time (real time) becomes larger than a predetermined constant time, bit data indicative of the calculated value of Fi exceeds a predetermined value due to the following causes, with the result that overflow can be brought about. If overflow is brought about, the comparison of max{F'i, ti} and selection of the smallest value of Fi in the calculation of the above Equation cannot be carried out in a proper manner.

If time information is handled based on a wrap-around system, when value difference exceeds a value of the (bit length −1)th power of 2, comparison of values in terms of size cannot be carried out with accuracy.

The deviation of the scheduled output time Fi from the real time causes the following erroneous operation. That is, when the selection operation is carried out based on the WFQ algorithm to determine a queue block which has the smallest scheduled output time Fi, the value of Fi of a queue block in which overflow is brought about tends to be extremely small as compared with those of other queue blocks. Thus, the queue in which overflow is brought about is continuously selected with priority.

For this reason, other queue blocks are unreasonably restricted in assignment of a bandwidth utilized for packet transmission, with the result that it becomes impossible to guarantee the bandwidth reservation for all of the queue blocks. Further, since the comparison of the value of scheduled output time, Fi cannot be effected in a fair manner, bandwidth resources cannot be assigned to queue blocks in a fair manner. Thus, guarantee of bandwidth reservation and bandwidth assignment in a fair manner, which are originally intended in the WFQ algorithm, cannot be effected in a desired manner.

Now description will be hereinafter made on the deviation of the scheduled output time from the real time, which is the cause of overflow in the calculation step of the WFQ algorithm of Equation (2).

A first cause of deviation of the scheduled output time from the real time is a rounding-off error deriving from the restriction of bit length regarding the scheduled output time, Fi based on the WFQ algorithm. For example, a reciprocal of the reserved bandwidth ri is introduced in the second term of Equation (2). Thus, the rounding-off error deriving from the division is caused.

As described above, the value of Fi is calculated from the scheduled output time F'i of a packet which was outputted in the preceding step. Therefore, the rounding-off error deriving from the bit-length restriction can be accumulated each time a packet is outputted. Accordingly, the rounding-off error deriving from the bit error restriction of the scheduled output time calculation can cause the deviation of the scheduled output time from the real time.

As a second cause of the deviation of the scheduled output time from the real time is that there is a disagreement between an output link speed, R in accordance with the calculation based on the WFQ algorithm and an actual transmission speed of the network due to the following principal three reasons.

That is, one reason of the disagreement between an output link speed, R and the actual transmission speed of the network is that, when a value of the packet length utilized in the calculation based on the WFQ algorithm is handled, a value of a header length added in a layer lower than the IP layer or the ATM layer is sometimes not taken into account.

That is, when a packet is transferred in the network, identification information such as a header (IP header, MAC header or the like), a preamble or the like is added to the packet, and a transmission speed of the packet is determined in accordance with the transferred data size including the header information. On the other hand, when a user of the network designates a reserved bandwidth, the size of the data to be transferred is not intended to include the header data amount below a certain layer.

For this reason, the packet length in terms of a calculation of the WFQ algorithm is intended not to include the length of the header below the certain layer. In this way, there can be caused a disagreement between the data transmission speed in terms of estimation based on calculation and the real transmission speed, depending on which portion of the packet information is to be included in a target of transmission upon designating the reserved bandwidth or which portion of the real packet is to be included in an object of WFQ calculation as the packet length Li.

Also, an addition-deletion processing (transfer media converting processing, VLAN tag processing of Ethernet, a header processing to an option of IPv6) and so on are selectively effected depending on the necessity in the packet transferring apparatus. In expectation of the above header addition-deletion processing, the real transmission speed and the packet length determined by the reserved bandwidth may be estimated. However, such estimation can result in increase of processing load. In particular, a trouble can be caused when the transmission speed of the packet is intended to be increased. For this reason, it is difficult to achieve complete agreement between the bandwidth in terms of calculation and the bandwidth actually effected upon packet transmission.

A second reason of the disagreement between an output link speed, R and the actual transmission speed of the network is that, from the standpoint of management of the packet transferring apparatus, in order to ensure the assignment of reserved bandwidth, the value of R in terms of WFQ calculation is sometimes set to a value smaller than the actual transmission speed of the network.

In other words, from the WFQ management standpoint, the actual output link speed can be smaller than the value of R in terms of WFQ calculation depending on the state of congestion in the network. In such a case, if the actual output link speed becomes smaller than the value of $\Sigma \phi i$, the throughput of the network can be lowered due to the congestion of the network, with the result that the reserved bandwidth cannot be guaranteed for all of the queue blocks.

Thus, if it is requested to take the congestion state of the network, calculation error and so on into account, it is necessary for the value of R to be set to a safety value which can hold (R in terms of WFQ calculation)<(actual maximum transmission speed) regardless of the state of congestion of the network.

Further, a third reason of the disagreement between an output link speed, R and the actual transmission speed of the network is as follows. That is, a packet transferring algorithm different from the WFQ algorithm can be effected in an identical network in a bandwidth sharing manner. In this case, if a vacant bandwidth is provided from a bandwidth which is originally assigned to the other packet transferring algorithm, this fact means that a packet transmission is effected using a bandwidth larger than the value of R estimated by calculation when the packet is transmitted from a queue block to which the WFQ algorithm is applied. Also in this case, the output link speed R differs from the actual transmission speed of the network.

At this time, if the above second reason causes the disagreement between the output link speed R in terms of calculation based on the WFQ algorithm and the actual transmission speed of network, then the scheduled output time Fi is deviated from the real time. This deviation will be hereinafter described in more detail with an example.

It is supposed that some packets are already stored in a queue block and new packets are supplied to the queue continuously. In this case, selection is made on F'i for the first term, max{F'i, ti} of Equation (2). In this case, it is assumed that the output link speed R in terms of calculation is set to a value smaller than the value of actual transmission speed (transfer speed) of the network.

As shown in FIGS. 21(a) and 21(b), since the actual transmission speed of the network is larger than the value of R in terms of calculation, a large amount of data can be transmitted as compare with a case where the network actually provides transmission service at the speed of value R. Accordingly, the number of packet output operation (output queue selection) will be rapidly increased, with the result that the value of Fi will become larger rapidly in proportion to the increase of the packet output operation. That is, if the actual transmission speed of the network keeps higher than the value R in terms of calculation, the value Fi, or the scheduled output time will be rapidly increased as compared with actual time passage.

If the actual transmission speed of the network keeps higher than the value R in terms of calculation, the above-described rapid increase of Fi will continue. Thus, overflow is caused due to the bit number restriction regarding the value of Fi. If overflow is caused in the value of Fi of a certain queue block, this value of Fi is handled as an extremely small value as compared with the value of Fi of other queue block.

If the scheduled output time Fi is deviated from the real time as described above, the following error will be caused. That is, in the packet scheduler 102, since the value Fi of the certain queue block in which overflow is caused is handled as an extremely small value as compared with the value Fi of other queue block, this certain queue block is continuously selected as a queue block having a packet to be outputted with a priority.

For this reason, other queues are unreasonably restricted in assignment of a bandwidth utilized for packet transmission, with the result that it becomes impossible to guarantee the bandwidth reservation for all of the queues. Further, since the comparison of the value of scheduled output time, Fi cannot be effected in a fair manner, bandwidth resources cannot be assigned to queues in a fair manner. In this way, although it is an original intention for the WFQ algorithm to ensure bandwidth reservation and bandwidth assignment in a fair manner, the packet transferring apparatus fails to ensure bandwidth reservation and bandwidth assignment in a fair manner.

SUMMARY OF THE INVENTION

The present invention seeks to solve the above-identified problems. Therefore, it is an object of the present invention to provide a packet scheduler which can realize guarantee in bandwidth assignment and fair vacant bandwidth assignment while preventing erroneous operation deriving from deviation of a scheduled packet output time from the real time caused by calculation error in WFQ calculation.

In order to attain the above object, according to the present invention, there is provided a packet scheduler in which management is made on output awaiting packets stored in a plurality of queue blocks each of which has a weighting coefficient settled based on an output guaranteeing bandwidth, whereby an output order for the head packets stored in respective queue blocks is decided. The packet scheduler is arranged to include queue control means for controlling selection of a queue block having a packet to be sent at the highest priority stored therein, based on scheduled output time information obtained by calculation using management information of the output awaiting packets and the weighting coefficient of each queue block, and correcting means for correcting processing carried out in the queue control means based on the current time information. According to the above arrangement, it becomes possible to decrease erroneous operation when the packet scheduler carries out packet scheduling so that output bandwidth is guaranteed.

The above construction may be more preferably arranged. That is, the queue control means may be arranged to include scheduled output time calculating means for calculating a scheduled output time of a packet stored in each of the queues placed in a back-log state by using management information of the output awaiting packets and the weighting coefficient settled for each of the queues placed in a back-log state, and selecting means for selecting a queue having a packet to be sent at the highest priority stored therein based on each scheduled output time information deriving from calculation effected by the scheduled output time calculating means, and the correcting means makes the scheduled output time calculating means calculate the scheduled output time with the current time information taken into account so that selection processing carried out by the selecting means is corrected.

Further, the correcting means may be arranged to include deviation amount detecting means for detecting deviation amount of the scheduled output time information calculated on the queue selected and controlled by the queue control means from the current time information, and instructing means for providing to the selecting means an instruction that selection processing carried out by the selecting means should be corrected in accordance with the deviation amount detected by the deviation amount detecting means.

Furthermore, the instructing means may be arranged to provide to the selecting means instruction that the scheduled output time information created for each queue block as a reference of selection should be corrected in accordance with the deviation amount detected by the deviation amount detecting means.

The first proposed arrangement of the packet scheduler according to the present invention may include time information acquiring means supplied with management information useful for managing output awaiting packets stored in respective queue blocks together with the current time information, thereby making it possible for the time information acquiring means to acquire the current time information through the management information, wherein the correcting means may be arranged to correct the processing effected in the queue control means in accordance with the current time information acquired by the time information acquiring means.

The correcting means may be arranged to include deviation amount detecting means for detecting deviation amount of the scheduled output time information calculated by the scheduled output time calculating means from the current time information, and instructing means for providing to the selecting means instruction that selection processing carried out by the selecting means should be corrected in accordance with the deviation amount detected by the deviation amount detecting means.

Further, the correcting means may be arranged to include deviation amount detecting means for detecting deviation amount of a value of an intermediate parameter deriving from any calculation step effected in the scheduled output time calculating means from the current time information, and instructing means for providing to the selecting means an instruction that selection processing carried out by the selecting means should be corrected in accordance with the deviation amount detected by the deviation amount detecting means.

More preferably, the instructing means may be arranged to halt the selection processing effected in the selecting means depending on the deviation amount detected by the deviation amount detecting means.

Furthermore, according to the present invention, there is provided an operation environment setting monitoring apparatus for use with a packet scheduler. This packet scheduler is arranged for managing output awaiting packets stored in a plurality of queue blocks each of which has a weighting coefficient settled based on an output guaranteeing bandwidth, whereby an output order for the head packets stored in respective queue blocks is decided, and also the packet scheduler includes queue control means for controlling selection of a queue block having a packet to be sent at the highest priority stored therein, based on scheduled output time information obtained by calculation using management information of the output awaiting packets and the weighting coefficient of each queue block and correcting means for correcting processing carried out in the queue control means based on the current time information. The operation environment setting monitoring apparatus is arranged to include an operation environment setting unit for allowing a user to set a valid/invalid status of the correction processing effected by the correcting means and a display control unit for displaying and controlling the status and operation of the deviation correction effected in the packet scheduler.

According to the above arrangements of the present invention, the following advantages can be obtained.

(1) According to the above arrangement, the correcting means can correct the processing carried out by the queue control means based on the current time information. Therefore, it becomes possible to ensure assignment of vacant bandwidth in a fair manner while suppressing erroneous operation deriving from deviation of a scheduled packet output time from the real time caused by a calculation error or the like in WFQ calculation.

(2) Further, according to the above arrangement, the correcting means makes the scheduled output time calculating means calculate the scheduled output time with the current time information taken into account so that selection processing carried out by the selecting means is corrected. Therefore, the selecting means can carry out selecting operation by using a value which has been reliably subjected to the correction processing on the calculation error in the WFQ calculation. Accordingly, the bit data indicative of a calculated value of the scheduled output time can be prevented from overflow, with the result that the selecting means can carry out the selecting processing more reliably, and performance and reliability of the packet scheduler and the packet transferring apparatus can be improved.

(3) According to the arrangement of the present invention, the packet scheduler is arranged to include the time information acquiring means. Therefore, the time information acquiring means acquires the current time information together with the management information indicative of the state of the output awaiting packets. Accordingly, it becomes unnecessary to provide a functioning unit exclusively utilized for creating the time information, with the result that construction of the apparatus will be more simplified.

(4) According to the arrangement of the present invention, the correcting means can correct the selecting processing carried out by the queue control means by halting the selecting processing based on the current time information. Therefore, it becomes possible to ensure assignment of vacant bandwidth in a fair manner while preventing erroneous operation deriving from deviation of a scheduled packet output time from the real time caused by the calculation error in WFQ calculation.

That is, if the instructing means is arranged to halt the selection processing carried out by the selecting means in the queue control means depending on the deviation detected by the deviation detecting means, then it becomes possible to halt reading a packet from a queue block to which the WFQ algorithm is applied, i.e., to stop increasing in calculated data of scheduled output time, until the deviation of the scheduled output time data with the earliest time of output from the current time data comes to fall within a permissible range. Accordingly, it becomes possible to suppress the deviation of the scheduled output time from the current time.

(5) According to the arrangement of the operation environment setting monitoring apparatus, the operation environment setting unit allows a user to set a valid/invalid status of the environment of the deviation correction processing depending on the necessity of the deviation correction processing during the management of the apparatus. Therefore, the apparatus can be operated under an optimum environment for management. Accordingly, it is convenient for the operator to operate the apparatus.

BRIEF DESCRIPTION OF THE DRAWINGS

FIGS. 21(a) and 21(b) are each diagram for explaining the packet transfer technology using the conventional WFQ algorithm employed in the packet transferring apparatus on the network.

DESCRIPTION OF THE PREFERRED EMBODIMENTS

Embodiments of the present invention will be hereinafter described with reference to drawings.

(a1) Description of First Embodiment

Figure 1:
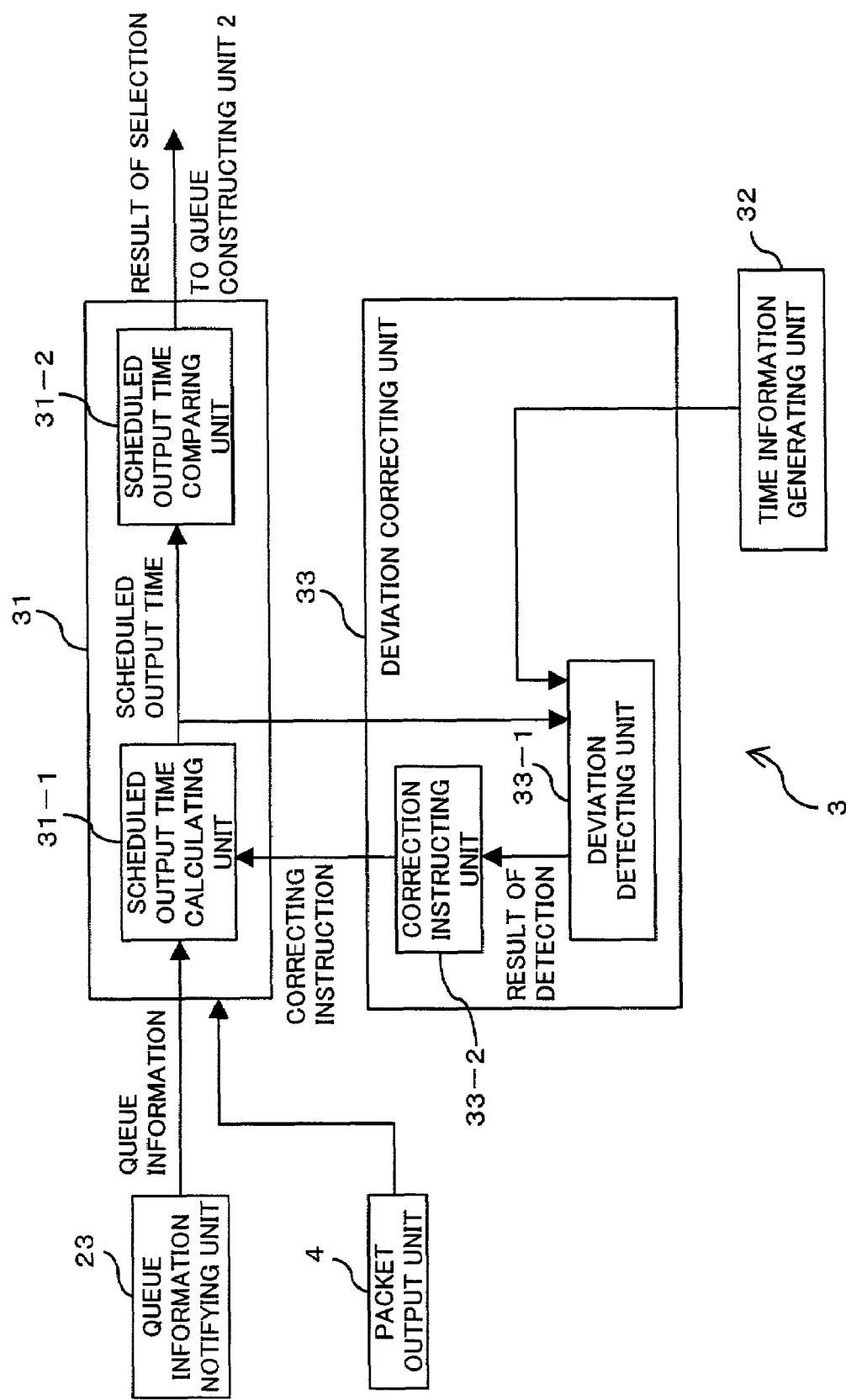
FIG. 1 is a block diagram showing a packet scheduler according to a first embodiment of the present invention.
Figure 2:
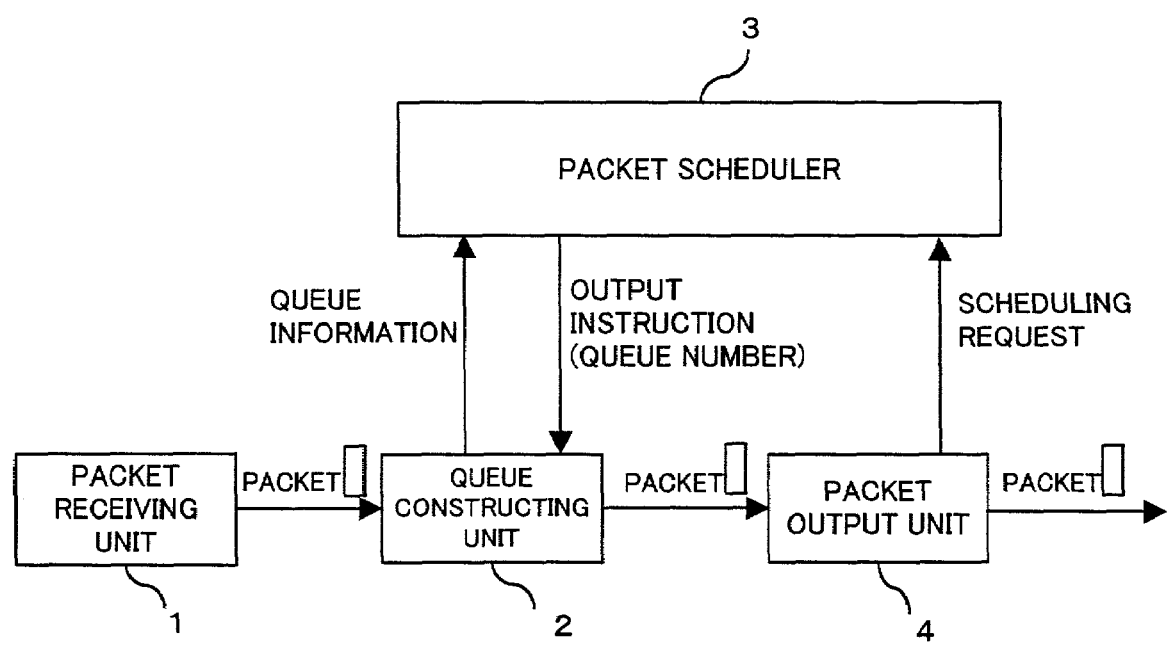
FIG. 2 is a block diagram showing a packet transferring apparatus to which the packet scheduler according to the present embodiment is applied.

FIG. 1 is a block diagram showing a packet scheduler according to a first embodiment of the present invention, and FIG. 2 is a block diagram showing a packet transferring apparatus. As shown in FIGS. 1 and 2, the packet scheduler of FIG. 1 is applied to the packet transferring apparatus of FIG. 2. The packet transferring apparatus of FIG. 2 is arranged to include a packet receiving unit 1, a queue constructing unit 2, the packet scheduler 3 and a packet output unit 4. The packet transferring apparatus can be utilized as a router employed in, for example, an IP (Internet Protocol) network, an ATM (Asynchronous Transfer Mode) network and so on.

Figure 3:
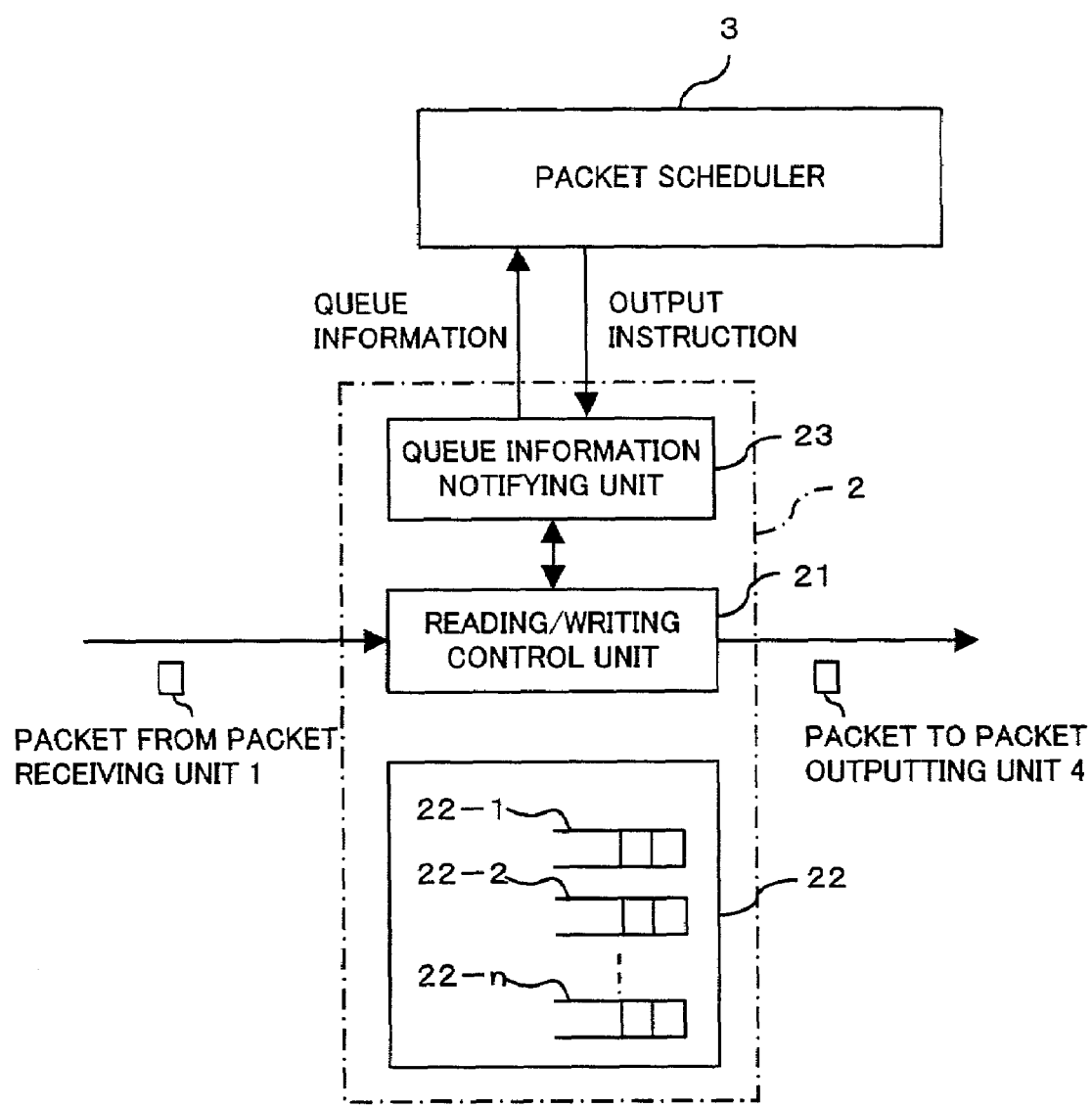
FIG. 3 is a block diagram showing a main portion of the packet transferring apparatus to which the packet scheduler according to the present embodiment is applied.

The packet receiving unit 1 is a unit for receiving a packet from the network and requesting a packet writing operation from the queue constructing unit 2. FIG. 3 is a block diagram of the packet transferring apparatus in which the queue constructing unit 2 is illustrated in more detail. As shown in FIG. 3, the queue constructing unit 2 is arranged to include a write/read control unit 21, an FIFO memory unit 22 and a queue information notifying unit 23.

Figure 19:
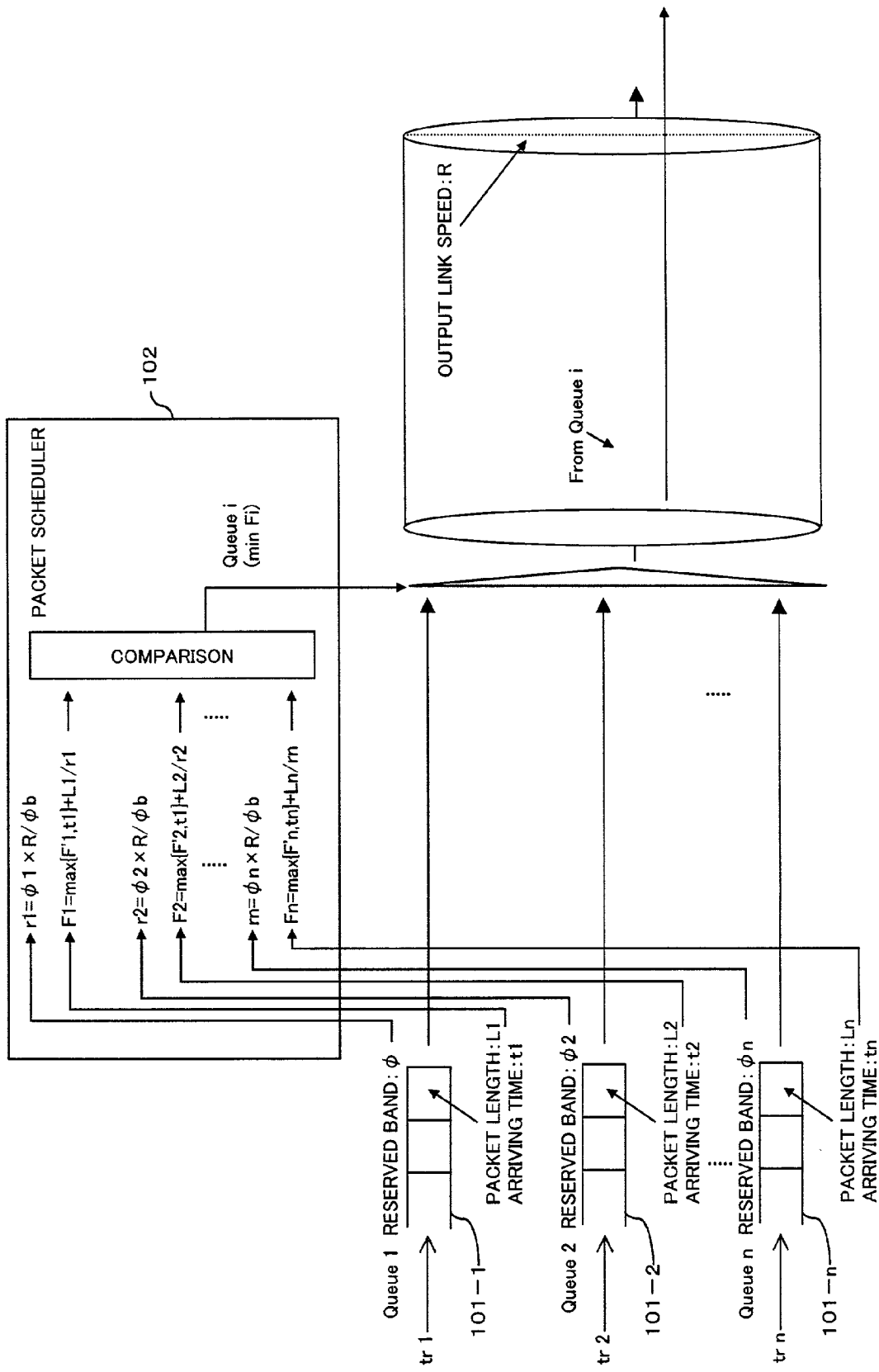
FIG. 19 is a diagram for explaining a packet transfer technology using a conventional WFQ algorithm employed in a packet transferring apparatus on a network.
Figure 20:
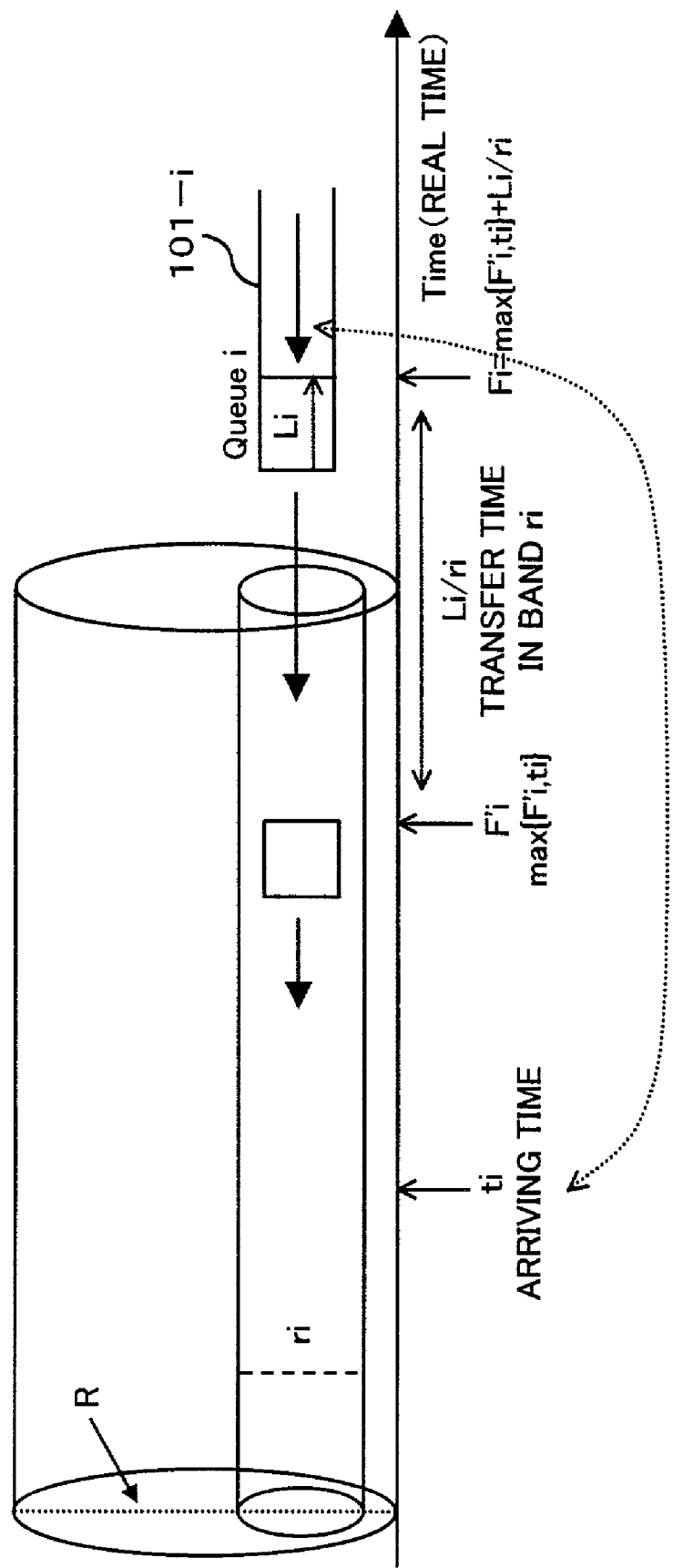
FIG. 20 is a diagram for explaining a packet transfer processing based on the WFQ algorithm.

The FIFO memory unit 22 is arranged to include a plurality of queue blocks 22-1 to 22-n. With this arrangement, packets can be classified into a number of groups depending on traffic of the packets and stored in any of the queue blocks. As for the queue blocks 22-1 to 22-n, similarly to the above-described queue blocks 102-1 to 102-n shown in FIG. 19, the queue information notifying unit 23 notifies respective queue information (whether there is a packet or not, packet arriving time, head packet length and so on) of the packet scheduler 1.

The writing/reading control unit 21 controls the writing operation of the packet received from the packet receiving unit 1 into the queue blocks 22-i (i; any of the integers from 1 to n) depending on the property of the desired traffic. The writing/reading control unit 21 also controls the reading operation of the packets stored in a corresponding queue blocks 22-i in accordance with a reading instruction received from the packet scheduler 3. The packet scheduler 3 is a unit for carrying out packet scheduling on the IP packets, the ATM packets and so on in accordance with the WFQ algorithm. In more concretely, the packet scheduler 3 selects one queue block from the queue blocks 22-1 to 22-n which are placed in the back-log state, and requests a reading operation of the head packet of the selected queue block from the queue constructing unit 2. The arrangement of the packet scheduler 2 will be described in more detail later on with reference to FIG. 1.

Of the above queue blocks 22-1 to 22-n, the operator is allowed to select a queue block to which the WFQ algorithm is not applied. In this case, the selected queue block is excluded from a group of queue blocks which will be subjected to the packet scheduling processing in accordance with the WFQ algorithm described later on.

The packet output unit 4 outputs a packet read from the queue constructing unit 3 to the network in accordance with the vacant state of the network. If it is allowable for the packet to be outputted to the network, the packet output unit 4 also requests from the packet scheduler 3 that a packet (packet scheduling processing) to be outputted next should be determined.

Successively, the arrangement of the packet scheduler 3 will be described in detail with reference to FIG. 1. The packet scheduler 3 shown in FIG. 1 is arranged to include a queue selection control unit (queue control means) 31 and a deviation correcting unit (correcting means) 33.

The queue selection control unit 31 is a unit for selecting a queue having packet data that should be outputted with the highest priority, based on scheduled output time information obtained by calculation using the management information and the weighting coefficient of the output awaiting packet stored in each of the queue blocks 22-1 to 22-n. The above-described function can be implemented by a scheduled output time calculating unit 31-1 and a scheduled output time comparing unit 31-2 shown in FIG. 1, for example.

The scheduled output time calculating unit (scheduled output time calculating means) 31-1 is a unit for calculating a scheduled output time which serves as a reference for deciding an output order of packet data pieces stored in respective queue blocks, by using the management information and the weighting coefficients of the output awaiting packet data pieces stored in respective queue blocks 22-1 to 22-n. The result of calculation is outputted as bit data to the scheduled output time comparing unit 31-2.

In more concretely, the scheduled output time calculating unit 31-1 is supplied with information of respective queue blocks 22-1 to 22-n as the above-described management information (whether there is an output awaiting packet or not, packet arriving time data, head packet length data and so on) from the queue information notifying unit 23. When the scheduled output time calculating unit 31-1 is supplied with the information, the scheduled output time calculating unit 31-1 carries out calculation of the above-described Equations (1) and (2), based on the supplied data and the weighting coefficient proportional to a bandwidth reserved for the traffic of the queue placed in the back-log state. That is, the scheduled output time calculating unit 31-1 carries out the calculation of Equations (1) and (2) where φi is taken as the weighting coefficient proportional to the bandwidth reserved for the traffic of the queue block 22-i placed in the back-log state, ti is taken as arriving time data of the head packet arriving at the queue block 22-i, Li is taken as head packet length data, and φb is taken as the sum of the all weighting coefficients φi of the queue blocks 22-i placed in the back-log state. With this calculation, a scheduled output time Fi can be calculated for each of the queue block placed in the back-log state.

The values of the weighting coefficients proportional to the bandwidth reserved for the traffic of the respective queue blocks 22-1 to 22-n may be stored in a memory function which is not illustrated within the packet scheduler 3, and the setting of the values may be change depending on necessity. Also, the values of F'i of the scheduled output time calculated in the preceding step for any of the queues 22-i may be stored in the memory function provided within the packet scheduler 3. When the scheduled output time calculating unit 31-1 is requested to calculate the scheduled output time in the next step, the scheduled output time data in the preceding step, i.e., the values of F'i, can be selectively read from the memory function provided within the packet scheduler 3.

The scheduled output time comparing unit (selecting means) 31-2 is a unit which is supplied with data of calculation result from the scheduled output time calculating unit 31-1. When the scheduled output time comparing unit 31-2 is supplied with the data, the scheduled output time comparing unit 31-2 selects a queue having a packet data piece that should be outputted with the highest priority, based on the respective scheduled output time information pieces calculated by the scheduled output time calculating unit 31-1.

In more concretely, of the scheduled time data pieces of the packets stored in the queue blocks calculated by the scheduled output time calculating unit 31-1, the scheduled output time comparing unit 31-2 selects a queue block corresponding to the scheduled output time data with the earliest time of output as a queue block having a packet data piece that should be outputted with the highest priority. Then, the scheduled output time comparing unit 31-2 notifies the queue constructing unit 2 of a queue block number (e.g., composed of bit data) attached to the selected queue block as a selection result.

A time information generating unit 32 is a unit provided outside the packet scheduler 3, for example. The time information generating unit 32 generates count data as current time information. Therefore, the time information generating unit 32 maybe composed of a counter generating count data, for example, which increments the count in synchronism with a clock signal supplied from a clock generating function provided in the packet transferring apparatus. The time information generating unit 32 may be composed of a counter generating count data which is created based on a clock signal within the packet scheduler 3, for example.

The deviation correcting unit 33 is a unit for correcting the processing effected by the queue selection control unit 31 based on the current time information. A function of this unit may be realized by a deviation detecting unit (deviation amount detecting means) 33-1 and a correction instructing unit (instructing means) 33-2 shown in FIG. 1, for example.

In this arrangement, the deviation detecting unit 33-1 is a unit for detecting the deviation of the respective scheduled output time information calculated by the scheduled output time calculating unit 31-1 from the current time information supplied from the time information generating unit 32. In more concretely, the deviation detecting unit 33-1 compares each of the scheduled output time data Fi calculated by the scheduled output time calculating unit 31-1 with a value (Time+k) which derives from addition of the current time data "Time" supplied from the time information generating unit 32 and a permissible deviation value "k", whereby the deviation detecting unit 33-1 determines whether correction is necessary or not. Then, determination resulting from the comparison is supplied to the correction instructing unit 33-2.

In more detail, the deviation detecting unit 33-1 compares the data of Fi about a queue block 22-i placed in the back-log state with the current time information. Then, determination is made on whether the result of the comparison satisfies the following Equation (3) or not. Thereafter, the result of determination is supplied to the correction instructing unit 33-2.

$$Fi \leq \text{Time} + k \qquad (3)$$

"Time" in the above Equation (3) is a data piece as the current time information, and "k" in the same equation is an upper limit of permissible value of deviation in terms of comparison between the scheduled output time data Fi and the current time data. Therefore, if the value of the scheduled output time Fi falls within a range satisfying Equation (3), it can be said that the deviation from the current time is permissible.

The correction instructing unit 33-2 is a unit for providing instruction to the scheduled output time calculating unit 31-1 so that the selection processing effected in the scheduled output time comparing unit 31-2 is corrected in accordance with the respective deviations detected by the deviation detecting unit 33-1. In more concretely, if the deviation detecting unit 33-1 determines that there is a queue block which does not satisfy the above Equation (3) (i.e., it is determined that any queue block 22-i has a packet data of Fi value exceeding the value of Time+k), then the correction instructing unit 33-2 supplies an instruction to the scheduled output time calculating unit 31-1 so that the value of Fi is replaced with the value of Time+k.

In other words, the correction instructing unit 33-2 supplies instruction to the scheduled output time calculating unit 31-1 so as to correct the scheduled output time, whereby the calculated value of Fi in the next step is made appropriate. In this way, the correction processing effected by the scheduled output time comparing unit 31-2 can be corrected in an indirect manner.

As described above, the deviation correcting unit 33 effects correction processing, which fact makes it possible to prevent the bit data indicative of the calculated value of Fi from exceeding a predetermined constant time, and overflow can be prevented from being brought about. Thus, the scheduled output time comparing unit 31-2, which is provided on a downstream side of the scheduled output time calculating unit 31-1, can always effect the minimum value selection processing reliably and appropriately.

The current time information supplied from the above-described time information generating unit 32 serves as an index for determining the current time. In the operation of the packet scheduling, it can be expected that the time when a packet is actually transmitted from the queue block 22-i can be deviated from the scheduled output time. However, according to the above arrangement, the actual time is added with a value of "k" which indicates a permissible range of comparison, and when the scheduled output time is subjected to comparison, the time added with a value of "k" is utilized. Therefore, detection of the deviation will be effected with allowance, i.e., the deviation detecting unit 31-1 will not detect a deviation small enough not to cause a problem such as overflow or the like, and will detect only deviation of Fi obviously large enough to cause the problem of overflow.

Now, detail description will be made on a packet transferring apparatus having the above arrangement to which the packet scheduler according to the first embodiment of the present invention is applied.

Initially, the packet receiving unit 1 of the packet transferring unit receives a packet from the network. When the packet receiving unit receives a packet, the packet receiving unit requests from the writing/reading control unit 21 of the queue constructing unit 2, a writing control on a packet of the received packets that should be further transferred through the network. When the writing/reading control unit 21 of the queue constructing unit 2 controls the writing operation of the packet data into the FIFO memory unit 22, the writing/reading control unit 21 selects a queue block 22-i into which the packet to be transferred is written in accordance with the reserved bandwidth of traffic. In this way, the packet data that should be further transferred is held in a queue block 22-i corresponding to the reserved bandwidth of traffic.

In the packet scheduler 3, the output order of the packet data as the packet to be outputted held in the queue blocks 22-i is decided by a packet scheduling processing based on the WFQ algorithm which will be described later on. The packet output unit 4 outputs packets as packets to be transferred through the network in accordance with the output order which was decided by the packet scheduler 3.

At this time, when the packet output unit 4 is placed in a state allowable to output the packet to the network, the packet output unit 4 requests a scheduling from the packet scheduler 3. When the packet scheduler 3 receives the request from the packet output unit 4, the packet scheduler 3 carries out a scheduling processing having the WFQ algorithm applied thereto as shown in a flowchart of FIG. 4. Thus, a queue block having stored therein a packet to be outputted with the highest priority is selected.

Figure 4:
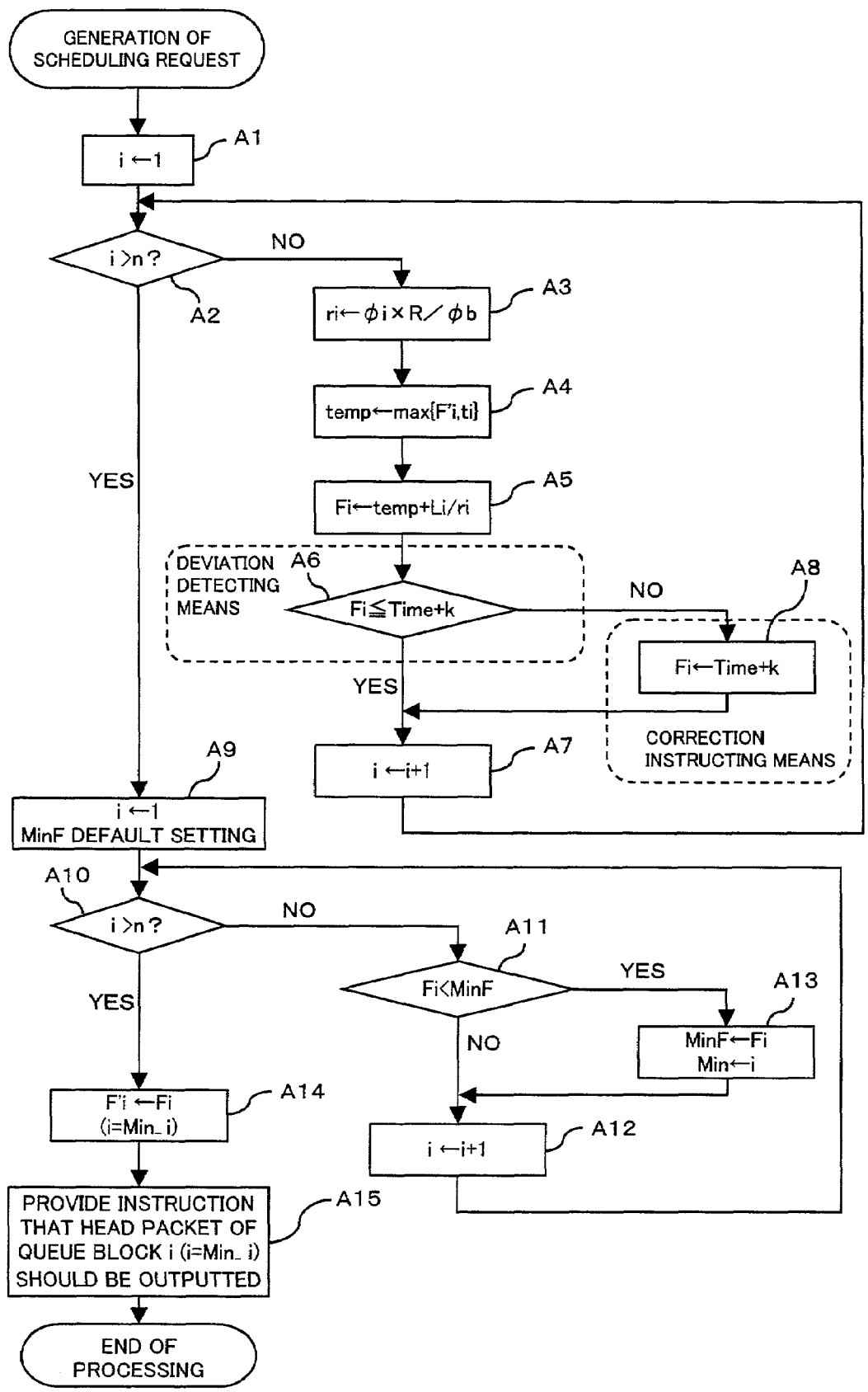
FIG. 4 is a flowchart for explaining an operation of the first embodiment of the present invention.

Initially, the scheduled output time calculating unit 31-1 of the packet scheduler 3 calculates the scheduled output time of each queue 22-i placed in the back-log state by using the above-described Equations (1) and (2) (step A1, steps A2 to A5, step A7). A variable "temp" appearing in steps A4 and A5 of FIG. 4 represents an auxiliary variable which is temporarily stored in a memory unit and utilized in a calculation step of the above-described Equations (1) and (2).

The deviation detecting unit 33-1 of the deviation correcting unit 33 compares the scheduled output time Fi of each queue block 22-i (i=1 to n) calculated as a scheduled output time (steps A5) with the current time information defined by the above-described Equation (3). In accordance with the result of the comparison, the deviation detecting unit 33-1 determines whether or not the deviation of the calculated scheduled output time data from the current time falls in the permissible range (step A6). The result of determination based on the comparison is supplied from the deviation detecting unit 33-1 to the correction instructing unit 33-2.

If the value of the scheduled output time Fi satisfies the above-described Equation (3), the deviation detecting unit 33-1 determines that the calculated scheduled output time Fi falls within the permissible range, and then outputs the result of determination to the correction instructing unit 33-2. In this case, the correction instructing unit 33-2 directly outputs the value of Fi calculated by the scheduled output time calculating unit 31-1 to the scheduled output time calculating unit 31-1 as scheduled output time data utilized in the processing of the scheduled output time comparing unit 31-2 provided on the downstream stage (YES route of step A6).

On the other hand, if the value of the scheduled output time Fi does not satisfy the above-described Equation (3), the deviation detecting unit 33-1 determines that the calculated scheduled output time Fi takes a value beyond the permissible range, and then outputs the result of determination to the correction instructing unit 33-2. The correction instructing unit 33-2 carries out correction by replacing the value of Fi with the value of "Time+k" indicative of the permissible deviation range in accordance with the result of determination supplied from the deviation detecting unit 33-1 (No route of step A6 to step A8).

With the above processing, of the queue blocks 22-1 to 22-n, any queue block placed in the back-log state can be subjected to the correction in which the scheduled output data sequentially calculated is corrected so as to fall within the permissible range based on the current time data. Then, the corrected data of scheduled output time is supplied to the scheduled output time comparing unit 31-2 which is provided on the downstream stage (from NO route of step A2 to steps A3 to A7).

The scheduled output time comparing unit 31-2 is supplied with the scheduled output time data which has been subjected to the necessary correction on each queue block placed in the back-log state, from the scheduled output time calculating unit 31-1. Then, the scheduled output time comparing unit 31-2 selects a queue block having scheduled output time data with the earliest time of output from the respective scheduled output time data pieces (step A9 to step A13).

When the scheduled output time comparing unit 31-2 selects a queue block having scheduled output time data with the earliest time of output (e.g., Fi of the queue block 22-i), the value of Fi is set to the scheduled output time F'i of the preceding step and stores the same in a memory (not shown) for the scheduled transmission time calculation in the next step (step A14). Thereafter, the packet scheduler 3 notifies the writing/reading control unit 21 of the queue constructing unit 2 of the number of queue block 22-i corresponding to the selected Fi. In this way, the reading operation of the queue block 22-i can be controlled in the writing/reading control unit 21 (step A15).

As described above, the packet scheduler 3 carries out scheduling processing, and instruction is provided so that a packet to be outputted is read in accordance with the scheduling. Then, a head packet of the selected queue block 22-i is read and outputted from the packet output unit 4 to the network.

As described above, according to the arrangement of the packet scheduler 3 as the first embodiment of the present invention, the deviation correcting unit 33 corrects the processing effected by the queue selection control unit 31 based on the current time information. Therefore, it becomes possible to ensure assignment of a vacant bandwidth in a fair manner while preventing erroneous operation deriving from deviation of a scheduled packet output time from the real time caused by a calculation error in the WFQ calculation.

Further, according to the above arrangement, the deviation correcting unit 33 carries out correction so that deviation of each scheduled output time information as a result of calculation effected by the scheduled output time calculating unit 31-1 from the current time information can fall within the permissible range. With this correction, the scheduled output time calculating unit 31-1 calculates the scheduled output time with the current time information taken into account so that selection processing carried out by the scheduled output time comparing unit 31-2 is corrected. Therefore, the scheduled output time comparing unit 31-2 can carry out selecting operation by using a value which has been reliably subjected to the correction processing in the calculation error in the WFQ calculation. Accordingly, the bit data indicative of a calculated value of the scheduled output time can be prevented from overflow, with the result that the scheduled output time comparing unit 31-2 can carry out the selecting processing more reliably, and performance and reliability of the packet scheduler and the packet transferring apparatus can be improved.

(a2) Description of a First Modification of the First Embodiment

In the above first embodiment, when the deviation detecting unit 33-1 of the deviation correcting unit 33 determines the size of the deviation of the scheduled output time data from the current time, count data as the current time information generated from the time information generating unit 32 is employed. However, the arrangement of the present embodiment is not limited to the above one, but as for example a packet scheduler 3-1 shown in FIG. 5, employed current time information may be one extracted from the queue management information supplied from the queue information notifying unit 23.

Figure 5:
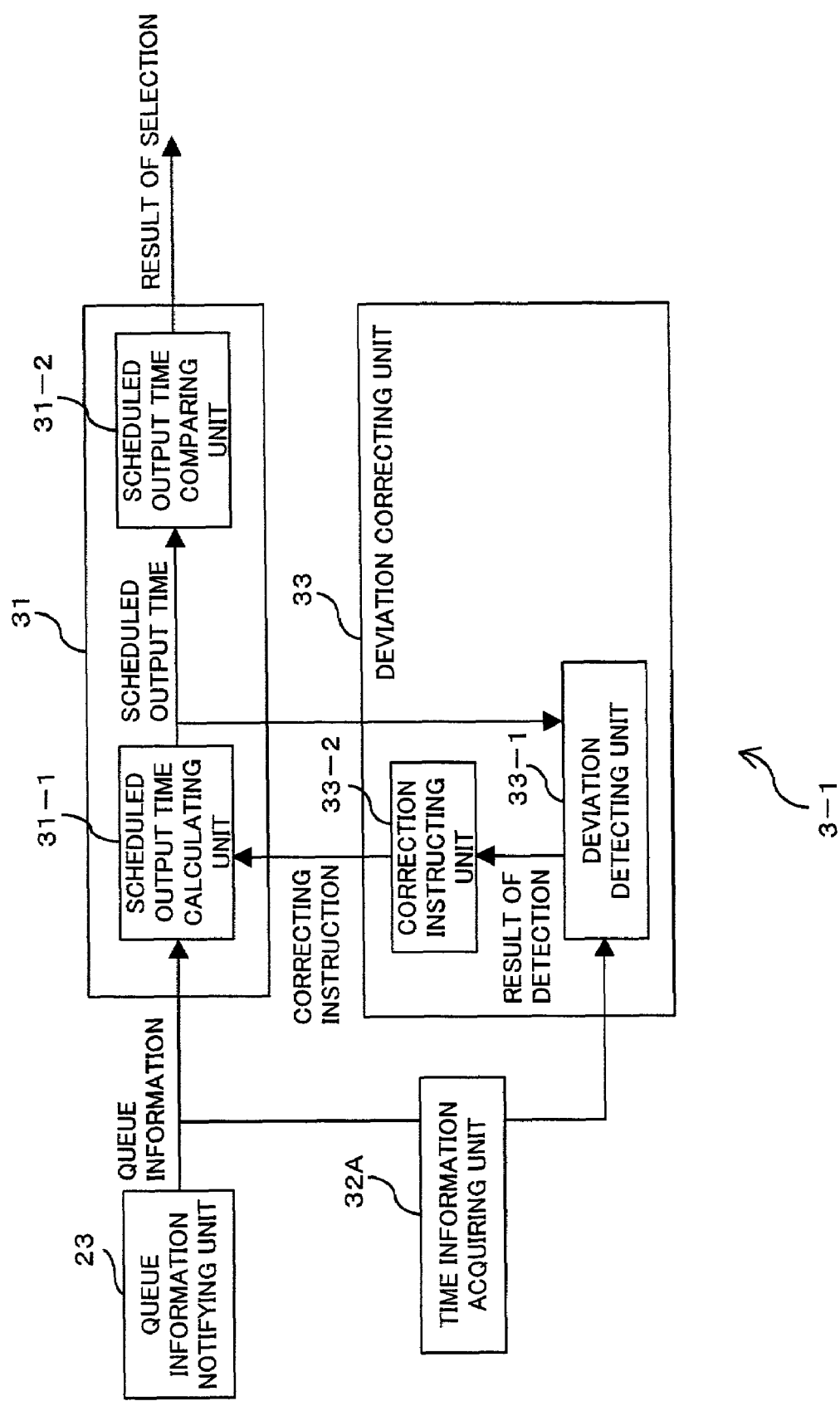
FIG. 5 is a block diagram showing a packet scheduler according to a first modification of the first embodiment of the present invention.

The packet scheduler shown in FIG. 5 is different from the packet scheduler (reference numeral is 3) shown in FIG. 1 in that the time information generating unit 32 is replaced with a time information acquiring unit 32A which is arranged to extract time information from the queue management information supplied from the queue information notifying unit 23 and to acquire the same. The remaining portion of the arrangement is fundamentally similar to that of the packet scheduler 3 shown in FIG. 1. In FIG. 5, like parts corresponding to those in FIG. 1 are identified by the same reference numerals.

That is, the time information acquiring unit 32A is a unit for extracting information regarding a packet arriving time from the queue management information supplied from the queue information notifying unit 23 and acquiring the same. When the time information acquiring unit 32A acquires the acquired packet arriving time information, it supplies the acquired packet arriving time information to the deviation detecting unit 33-1 as a current time information.

For example, when the queue information notifying unit 23 generates management information about the queue block 22-i, the time information acquiring unit 32A extracts packet arriving time information ti (time information indicative of a time when the last packet arrives at the queue block 22-i) from the management information. Then, the time information acquiring unit 32A outputs the packet arriving time information ti to the deviation detecting unit 33-1 as the current time information. In other words, when the deviation detecting unit 33-1 determines the width of the deviation of the scheduled output time calculated on the queue block 22-i, the deviation detecting unit 33-1 can utilize the packet arriving time information ti supplied from the time information acquiring unit 32A as a reference of determination.

In more concretely, the deviation detecting unit 33-1 is supplied with scheduled output time data (e.g., data Fi calculated on the queue block 22-i) calculated by the scheduled output time calculating unit 31-1 and arriving time data ti as current time data from the time information acquiring unit 32A. Then, the deviation detecting unit 33-1 compares the data Fi and data ti+k (a deviation permission value relative to the data ti, this value is determined in advance) with each other. Thereafter, the result of comparison and determination is supplied to the correction instructing unit 33-2.

In other words, the deviation detecting unit 33-1 compares the scheduled output time data F'i in the preceding step on the queue block 22-i and the current time data Time+k with each other, and determines whether the comparing result satisfies the following equation (3-1) or not. Then, the deviation detecting unit 33-1 supplies the result of comparison and determination to the correction instructing unit 33-2.

$$Fi \leq ti+k \qquad (3\text{-}1)$$

The correction instructing unit 33-2 is a unit for issuing an instruction in accordance with the deviation amount detected by the deviation detecting unit 33-1 so that the selection processing effected by the queue selection control unit 31 is corrected. In more concretely, if the deviation detecting unit 33-1 determines that there is a queue block which does not satisfy the above Equation (3-1) (i.e., any queue block 22-i having a value of F'i exceeding the value "Time+k" is found), then instruction is made to the scheduled output time calculating unit 31-1 so that the value of F'i is replaced with "Time+k".

Similarly to the time information generating unit 32 of the above-described first embodiment, the current time information supplied from the above-described time information generating unit 32A serves as an index for determining the current time. In the operation of the packet scheduling, it can be expected that the time when a packet is actually transmitted from the queue block 22-i can be deviated from the scheduled output time. However, according to the above arrangement, the actual time is added with a value of "k" which provides a permissible range of comparison, and when the scheduled output time is subjected to comparison, the time added with a value of "k" is utilized. Therefore, detection of the deviation will be effected with allowance, i.e., the deviation detecting unit 31-1 will not detect a deviation small enough not to cause a problem such as overflow or the like, and will detect only deviation of Fi obviously large enough to cause the problem of overflow.

Figure 6:
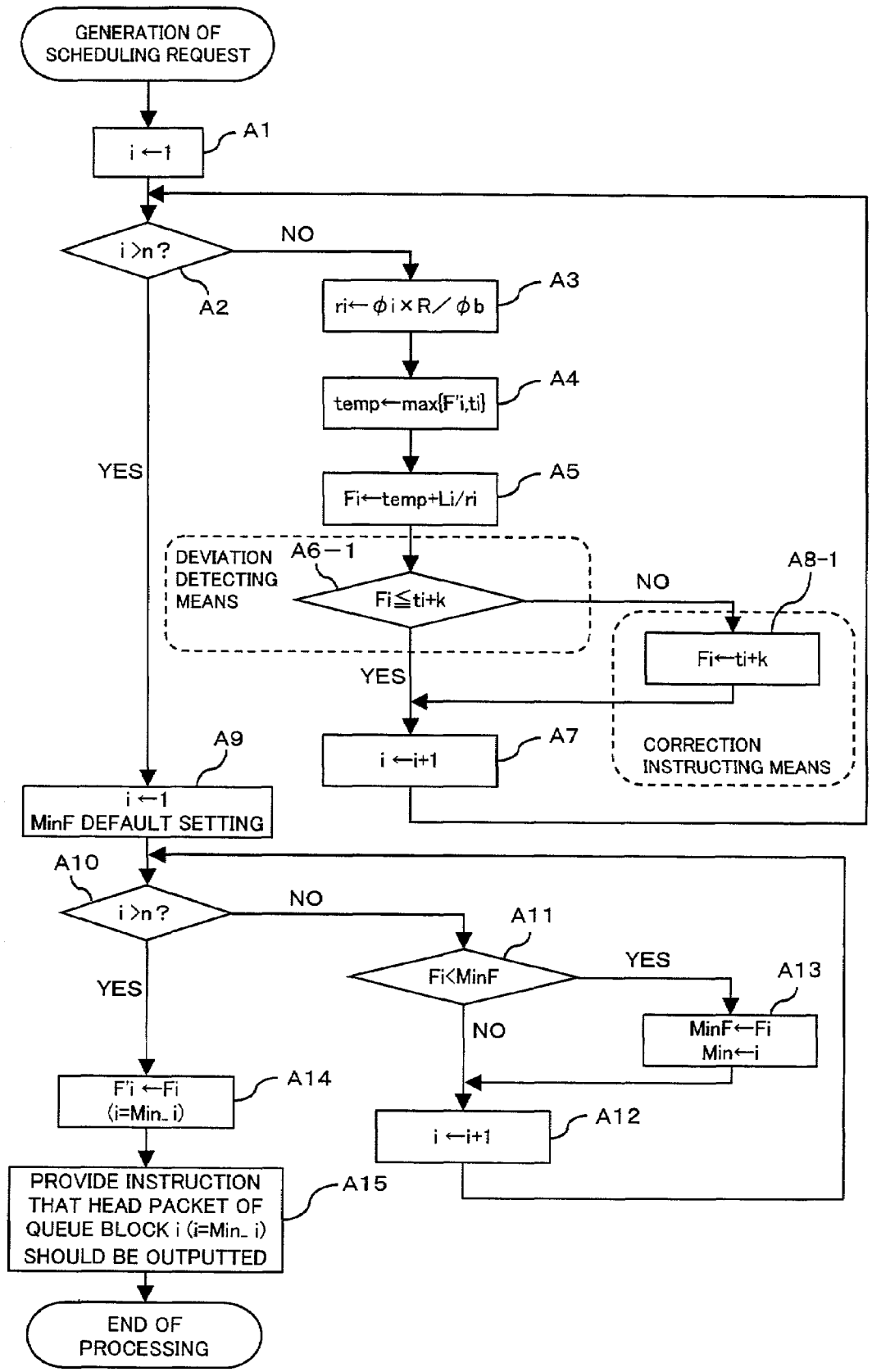
FIG. 6 is a flowchart for explaining an operation of the first modification of the first embodiment of the present invention.

Now, description will be made on operation of the packet scheduler 3-1 as the first modification of the first embodiment of the present invention having the above arrangement with reference to a flowchart shown in FIG. 6. The operation of the packet scheduler 3-1 as the first modification of the first embodiment is fundamentally similar to that of the above-described first embodiment except for that when the deviation correcting unit 33-1 carries out the deviation correction processing, the arriving time data acquired by the current time acquiring unit 32A is utilized as the current time data. In the flowchart of FIG. 6, a processing step illustrative of substantially the same operation step as that of the flowchart of FIG. 4 is attached with the same reference numeral. The following description will be made with emphasis on operation steps different from those of the above flowchart of FIG. 4.

That is, the deviation detecting unit 33-1 of the deviation correcting unit 33 determines whether or not, of the queue blocks 22-1 to 22-n, the scheduled output time (e.g., data Fi of the queue block 22-i) calculated on a queue block placed in the back-log state can fall within a permissible range which is identified in accordance with the current time information acquired by the time information acquiring unit 32A (step A6-1).

In more concretely, the deviation detecting unit 33-1 carries out comparison between the value of Fi and the value of "ti+k". With this comparing operation, if it is confirmed that the above Equation (3-1) is satisfied, then it is determined that the deviation amount falls within the permissible range. Conversely, if it is confirmed that the above Equation (3-1) is not satisfied, then it is determined that the deviation amount does not fall within the permissible range. The result of detection is supplied to the correction instructing unit 33-2.

If the correction instructing unit 33-2 determines that the above-described Equation (3-1) is satisfied, as a result of comparison between the value of Fi and the value of "ti+k", the correction instructing unit 33-2 provides to the scheduled output time calculating unit 31-1 an instruction that the value of Fi does not undergo the correction processing and is supplied to the scheduled output time comparing unit 31-2 provided in the downstream stage (YES route of step A6-1). Conversely, if the correction instructing unit 33-2 determines that the above-described Equation (3-1) is not satisfied, the correction instructing unit 33-2 provides to the scheduled output time calculating unit 31-1 an instruction that the value of Fi is replaced with the value of "ti+k" (NO route of step A6-1 to step A8-1).

With the above arrangement, the scheduled output time comparing unit 31-2 can carry out comparison which is made on the scheduled output time data having been subjected to the necessary correction in accordance with the correction instruction issued from the correction instructing unit 33-2. Further, the scheduled output time comparing unit 31-2 can select a queue block having a packet to be outputted with the highest priority in accordance with the result of comparison. Accordingly, it becomes possible to suppress deviation of the scheduled output time from the real time, and moreover it becomes possible to eliminate the cause of overflow.

Therefore, also in the packet scheduler 3-1 as the first modification of the first embodiment, the deviation correcting unit 33 can correct the processing of queue selection control unit 31 based on the current time information. Accordingly, the packet scheduler 3-1 as the first modification of the first embodiment has advantages similar to those of the above-described first embodiment. In addition, the current time acquiring unit 32A can acquire the current time information through the management information supplied from the output awaiting packet data, and hence the packet scheduler becomes unnecessary to have a function unit exclusively utilized for generating the time information. Thus, the whole arrangement of the packet scheduler becomes more simplified.

(a3) Description of Second Modification of First Embodiment

In the above-described first modification, the deviation correcting unit 33 determines the amount of deviation of the scheduled output time from the current time by using each scheduled output time data (e.g., data Fi of queue block 22-i) as a result of calculation deriving from the scheduled output time calculating unit 31-1. However, the modification of the first embodiment is not limited to the above one. That is, as for example a packet scheduler 3-2 shown in FIG. 7, the packet scheduler may be arranged so that the amount of deviation of the scheduled output time from the current time is detected by using an intermediate parameter which derives from a step of calculating each scheduled output time.

Figure 7:
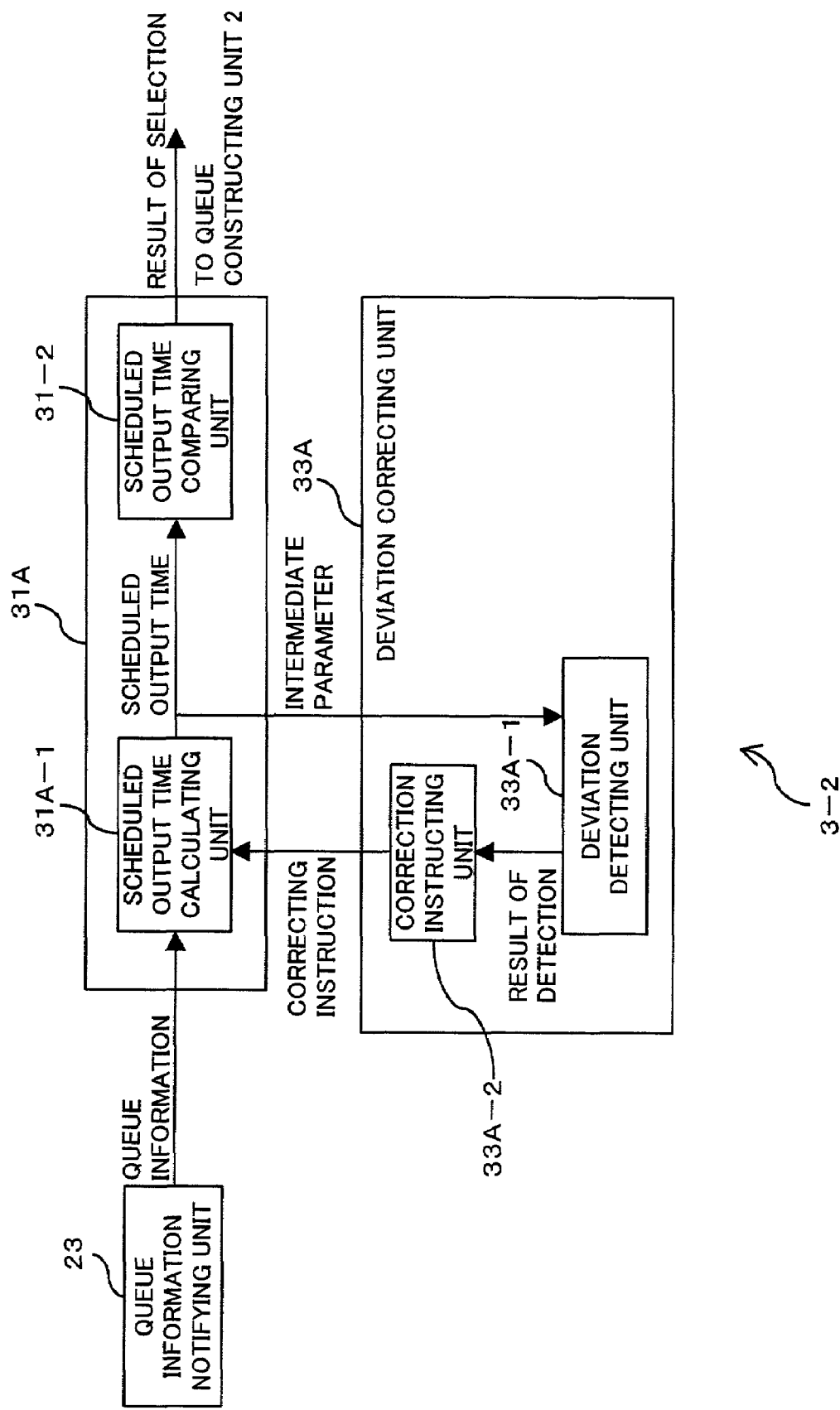
FIG. 7 is a block diagram showing a packet scheduler according to a second modification of the first embodiment of the present invention.

The packet scheduler 3-2 shown in FIG. 7 is different from the packet scheduler (see reference numeral 3) shown in FIG. 1 in its arrangement. That is, the result of calculation effected by the scheduled output time calculating unit 31A-1 is not directly utilized, but the current time information supplied from the time information generating unit 32 is taken into account for determining the value of the intermediate parameter which derives from the step of calculation. By using the intermediate parameter, the deviation correcting unit 33A makes correction on the selecting processing effected by the scheduled output time comparing unit 31-2 of the queue selection control unit 31A. The packet scheduler 3-2 shown in FIG. 7 and the packet scheduler shown in FIG. 1 share substantially the same arrangement in remaining portions thereof.

That is, the deviation detecting unit 33A-1 of the deviation correcting unit 33A detects the deviation of the scheduled output time information from the current time information supplied from the time information generating unit 32. In this case, the scheduled output time information is one utilized as an intermediate parameter in the calculation effected by the scheduled output time calculating unit 31A-1 and calculated upon packet output in the preceding step.

In more concretely, the deviation detecting unit 33A-1 compares the scheduled output time data F'i calculated upon packet output from the queue block 22-i in the preceding step with the value of (Time+k) which is created by adding the current time data Time supplied from the time information generating unit 32 and the deviation permissible value k together. Then, the deviation detecting unit 33A-1 supplies the result of comparison and determination to the correction instructing unit 33A-2 of the deviation correcting unit 33A.

In other words, the deviation detecting unit 33A-1 compares the data of F'i about a queue block 22-i with the current time information, Time+k. Then, determination is made on whether the result of the comparison satisfies the following Equation (3-2) or not. Thereafter, the result of determination is supplied to the correction instructing unit 33A-2.

$$F'i \leq \text{Time} + k \tag{3-2}$$

With the above arrangement, if the deviation detecting unit 33A-1 determines that there is a queue block which does not satisfy the above Equation (3-2) (i.e., it is determined that any queue block 22-i has a packet data of F'i value exceeding the value of Time+k), then the correction instructing unit 33A-2 supplies an instruction to the scheduled output time calculating unit 31A-1 so that the value of F'i is replaced with the value of Time+k.

Also in the packet scheduler 3-2 having the above arrangement according to the second modification of the first embodiment of the present invention, the operation thereof is fundamentally similar to that of the above-described first embodiment except for the deviation correction processing effected in the deviation correcting unit 33A.

Figure 8:
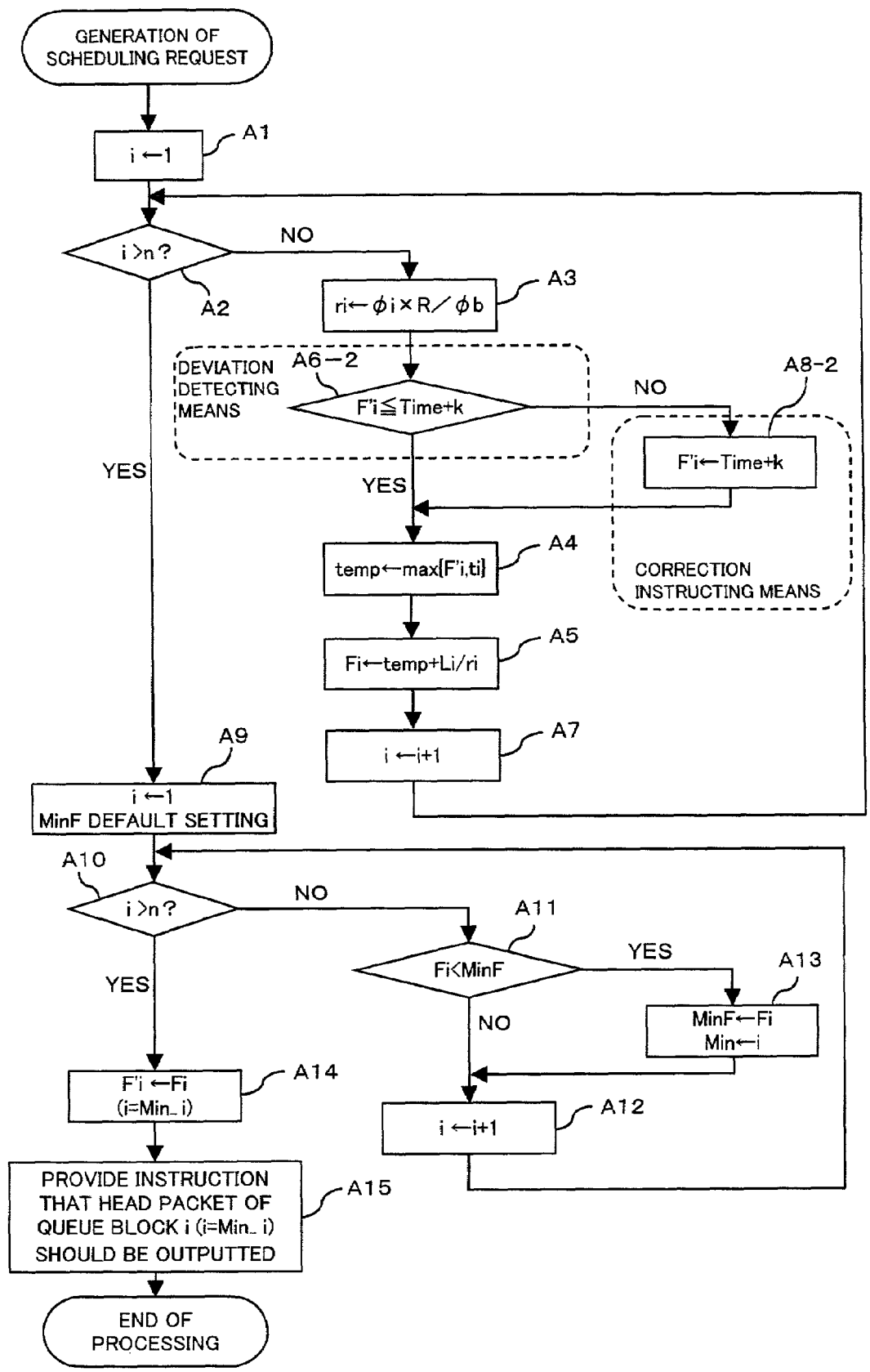
FIG. 8 is a flowchart for explaining an operation of the second modification of the first embodiment of the present invention.

FIG. 8 is a flowchart for explaining an operation of the second modification of the first embodiment of the present invention. As shown in a flowchart shown in FIG. 8, before a queue block placed in the back-log state (e.g., data Fi of the queue block 22-i) is selected from the queue blocks 22-1 to 22-n and calculation is made on the scheduled output time data of the selected queue block, the deviation detecting unit 33A-1 of the deviation correcting unit 33A determines whether or not the permissible range encompasses the deviation amount of the value of the intermediate parameter F'i, which is useful for calculating the scheduled output time, from the current time.

In other words, the deviation detecting unit 33A-1 of the deviation correcting unit 33A is supplied from the scheduled output time calculating unit 31A-1 with the scheduled output time data as the intermediate parameter which is calculated upon outputting a packet in the preceding step. Then, the deviation detecting unit 33A-1 of the deviation correcting unit 33A determines whether or not the permissible range encompasses the deviation amount of the intermediate parameter value, F'i from the current time data.

For example, in the preceding step in which the scheduled output time data is calculated for the queue block 22-i, the deviation detecting unit 33A-1 compares the scheduled output time data F'i calculated upon outputting the packet in the preceding step with the value of "Time+k". Thus, it is determined whether the deviation of the value of F'i from the current time exceeds the permissible range or not (step A6-2). Thereafter, the result of determination is supplied to the correction instructing unit 33A-2.

At this time, if it is determined that the above Equation (3-2) is satisfied as a result of comparison between the value of F'i and the value of "Time+k", the correction instructing unit 33A-2 notifies the scheduled output time calculating unit 31A-1 of that the value of F'i is utilized as a parameter for use in the calculation of the scheduled output time for the queue block 22-i, and correction instruction is not made (YES route of step A6-2 to step A4).

Conversely, if it is determined that the above Equation (3-2) is not satisfied as a result of comparison between the value of F'i and the value of "Time+k", the correction instructing unit 33A-2 provides to the scheduled output time calculating unit 31A-1 an instruction that the value of F'i is replaced with a value of "Time+k" which represents the permissible deviation range (NO route of step A6-2 to step A8-2).

Thus, the scheduled output time calculating unit 31A-1 calculates the scheduled output time Fi by using the parameter, or the value of F'i which has been subjected to the necessary correction in accordance with the correction instruction provided from the correction instructing unit 33A-2. In this way, a countermeasure against a cause of overflow is taken.

Accordingly, also in the packet scheduler 3-2 as the second modification of the first embodiment, the deviation correcting unit 33A can correct the processing effected in the queue selection control unit 31A based on the current time information. Thus, advantages similar to those of the above-described first embodiment can be obtained.

Further, according to the above arrangement, the deviation correcting unit 33A carries out correction so that deviation of the intermediate parameter in each calculation step effected by the scheduled output time calculating unit 31A-1 from the current time information can fall within the permissible range. With this correction, the scheduled output time calculating unit 31A-1 calculates the scheduled output time with the current time information taken into account so that selection processing carried out by the scheduled output time comparing unit 31-2 is corrected. Therefore, the scheduled output time comparing unit 31-2 can carry out selecting operation by using a value which has been reliably subjected to the correction processing in the calculation error in the WFQ calculation. Accordingly, the bit data indicative of a calculated value of the scheduled output time can be prevented from overflow, with the result that the scheduled output time comparing unit 31-2 can carry out the selecting processing more reliably, and performance and reliability of the packet scheduler and the packet transferring apparatus can be improved.

(a4) Description of Third Modification of First Embodiment

Figure 9:
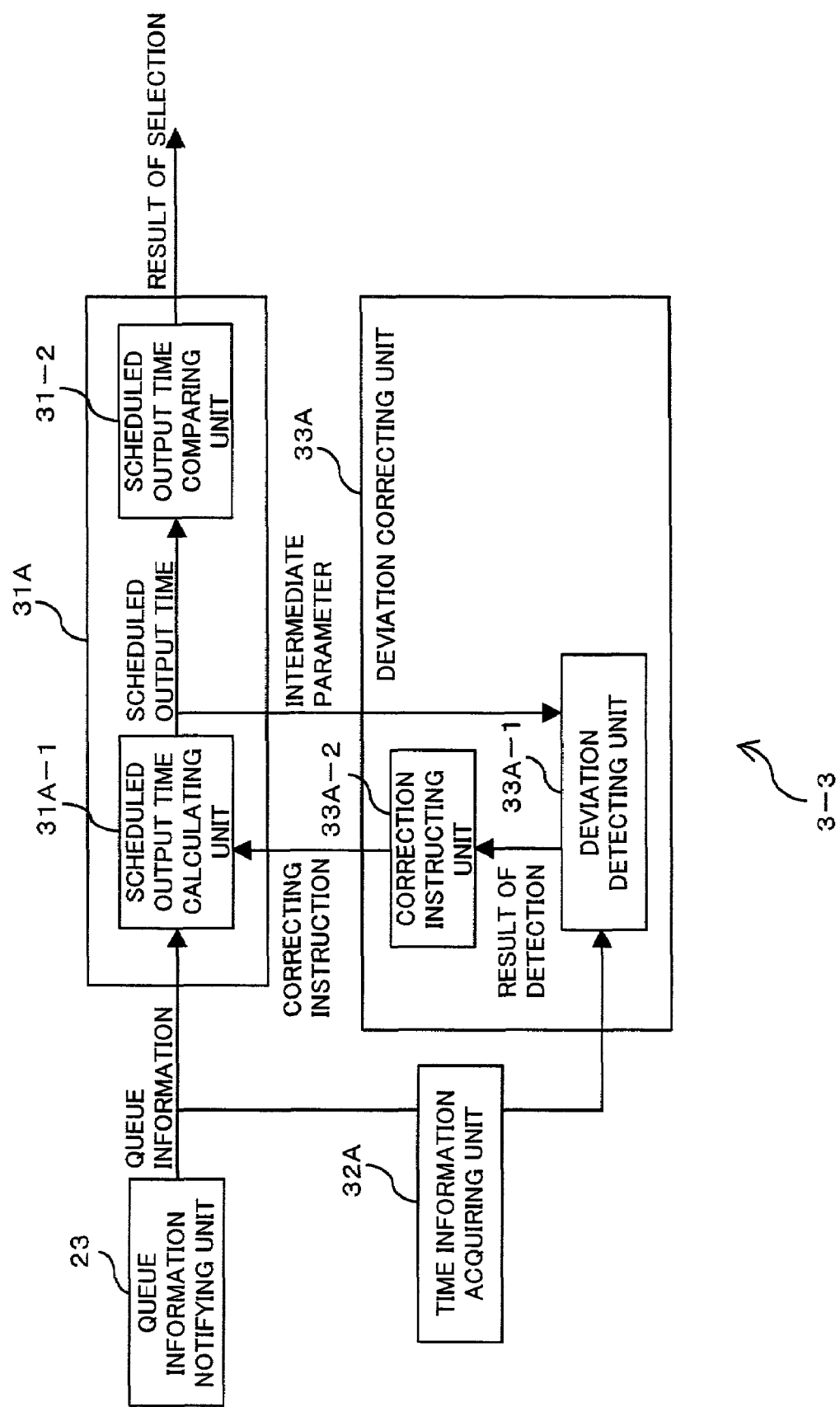
FIG. 9 is a block diagram showing a packet scheduler according to a third modification of the first embodiment of the present invention.

FIG. 9 is a block diagram showing an arrangement of a packet scheduler 3-3 as a third modification of the first embodiment of the present invention. The arrangement of the packet scheduler 3-3 shown in FIG. 9 derives from a combination of the above-described first modification of the first embodiment (see the arrangement denoted by reference numeral 3-1) and the second modification of the first embodiment (see the arrangement denoted by reference numeral 3-2).

The packet scheduler 3-3 as the third modification of the first embodiment differs from the above-described first embodiment (see arrangement denoted by reference numeral 3) in that the time information generating unit 32 is replaced with a time information acquiring unit 32A which extracts the current time information from the queue management information supplied from the queue information notifying unit 23. The packet scheduler 3-3 as the third modification also differs from the first embodiment in that the deviation correcting unit 33A does not directly utilize the result of calculation effected by the scheduled output time calculating unit 31A-1 but a value of the intermediate parameter in the calculation step with the current time information supplied from the time information generating unit 32 taken into account. Thus, correction is made on the selection processing effected in the scheduled output time comparing unit 31-2 as the selecting means. The remaining portion of the arrangement is fundamentally similar to that of the packet scheduler 3 shown in FIG. 1.

In more concretely, the deviation detecting unit 33A-1 compares the scheduled output time data F'i calculated on the queue block 22-i upon packet output in the preceding step and a value of (ti+k) which derives from addition of ti, or the current time data supplied from the time information acquiring unit 32A, with the permissible deviation value k. Then, the deviation detecting unit 33A-1 supplies the result of comparison and determination to the correction instructing unit 33A-2 of the deviation correcting unit 33A.

In other words, the deviation detecting unit 33A-1 compares the scheduled output time data F'i in the preceding step on the queue block 22-i and the current time data ti+k with each other so as to determine whether the comparing result satisfies the following equation (3-3) or not. Then, the deviation detecting unit 33A-1 supplies the result of comparison and determination to the correction instructing unit 33A-2.

$$F'i \leq ti+k \tag{3-3}$$

In FIG. 9, like parts corresponding to those in FIGS. 5 and 7 are identified by the same reference numerals.

The packet scheduler 3-3 as the third modification of the first embodiment of the present invention having the arrangement described above is different from the above described first embodiment in the following points. That is, when the deviation detecting unit 33A-1 carries out the deviation correcting processing, the arriving time data acquired by the current time acquiring unit 32A is utilized as the current time data, and the intermediate parameter created in a step of calculating the scheduled output time is utilized as a target of comparison with the current time data effected in the deviation detecting unit 33A. Except for the above points, the packet scheduler 3-3 as the third modification operates in a manner similar to that of the above-described first embodiment.

Figure 10:
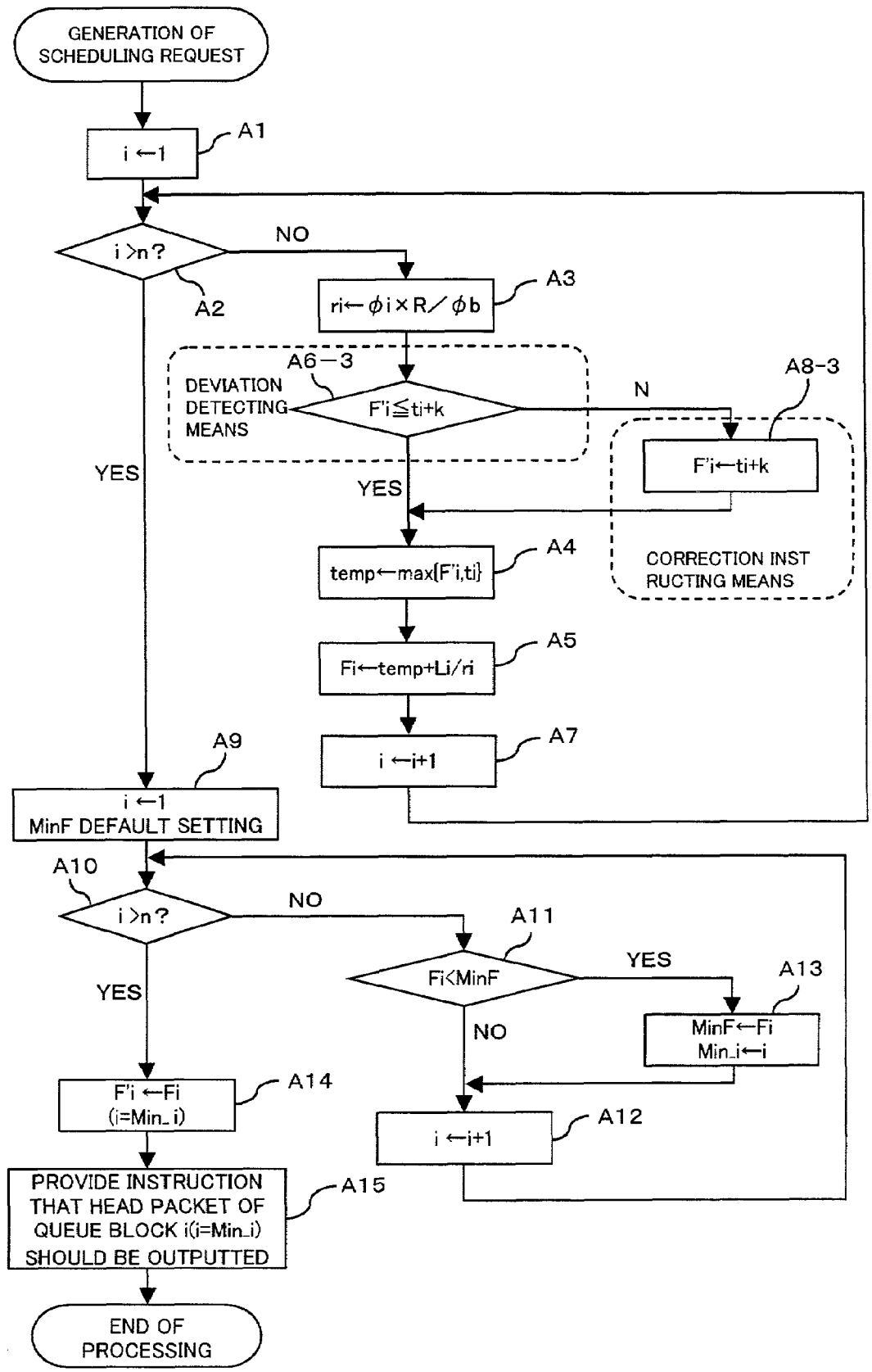
FIG. 10 is a flowchart for explaining an operation of the third modification of the first embodiment of the present invention.

FIG. 10 is a flowchart for explaining an operation of the third modification of the first embodiment of the present invention. As shown in a flowchart shown in FIG. 10, before a queue block placed in the back-log state (e. g., data Fi of the queue block 22-i) is selected from the queue blocks 22-1 to 22-n and calculation is made on the scheduled output time data of the selected queue block, the deviation detecting unit 33A-1 of the deviation correcting unit 33A determines whether or not the permissible range encompasses the deviation amount of the value of the intermediate parameter F'i, which is useful for calculating the scheduled output time, from the current time (step A6-3).

In other words, the deviation detecting unit 33A-1 of the deviation correcting unit 33A is supplied from the scheduled output time calculating unit 31A-1 with the scheduled output time data as the intermediate parameter which is calculated upon outputting a packet in the preceding step. Also, the deviation detecting unit 33A-1 is supplied from the time information acquiring unit 32A with packet arriving time data as the current time data. Then, the deviation detecting unit 33A-1 determines whether or not the permissible range encompasses the deviation amount of the intermediate parameter value from the current time data.

For example, in the preceding step in which the scheduled output time data is calculated for the queue block 22-i, the deviation detecting unit 33A-1 compares the scheduled output time data F'i calculated upon outputting the packet in the preceding step with the value of "ti+k". Thus, it is determined whether the deviation of the value of F'i from the current time exceeds the permissible range or not (step A6-3). Thereafter, the result of determination is supplied to the correction instructing unit 33A-2.

At this time, if it is determined that the above Equation (3-3) is satisfied as a result of comparison between the value of F'i and the value of "ti+k", the correction instructing unit 33A-2 provides to the scheduled output time calculating unit 31A-1 an instruction that the value of F'i is utilized as a parameter for use in the calculation of the scheduled output time for the queue block 22-i, and correction instruction is not made (YES route of step A6-3 to step A4).

Conversely, if it is determined that the above Equation (3-3) is not satisfied as a result of comparison between the value of F'i and the value of "ti+k", the correction instructing unit 33A-2 provides to the scheduled output time calculating unit 31A-1 an instruction that the value of F'i is replaced with a value of "ti+k" which represents the permissible deviation range (NO route of step A6-3 to step A8-3).

Thus, the scheduled output time calculating unit 31A-1 calculates the scheduled output time Fi by using the parameter, or the value of F'i which has been subjected to the necessary correction in accordance with the correction instruction provided from the correction instructing unit 33A-2. In this way, a countermeasure against a cause of overflow is taken.

Accordingly, also in the packet scheduler 3-3 as the third modification of the first embodiment, the deviation correcting unit 33A can correct the processing effected in the queue selection control unit 31A based on the current time information. Thus, advantages similar to those of the above-described first embodiment can be obtained. Moreover, since the arrangement of the third modification is provided with the current time information acquiring unit 32A, the circuit arrangement thereof can be more simplified.

Further, according to the above arrangement, the deviation correcting unit 33A carries out correction so that deviation of each scheduled output time information as a result of calculation effected by the scheduled output time calculating unit 31A-1 from the current time information can fall within the permissible range. With this correction, the scheduled output time calculating unit 31A-1 calculates the scheduled output time with the current time information taken into account so that selection processing carried out by the scheduled output time comparing unit 31-2 is corrected. Therefore, the scheduled output time comparing unit 31-2 can carry out selecting operation by using a value which has been reliably subjected to the correction processing for correcting the calculation error or the like in the WFQ calculation. Thus, advantages similar to those of the above-described second modification of the first embodiment can be obtained.

(b1) Description of Second Embodiment

Figure 11:
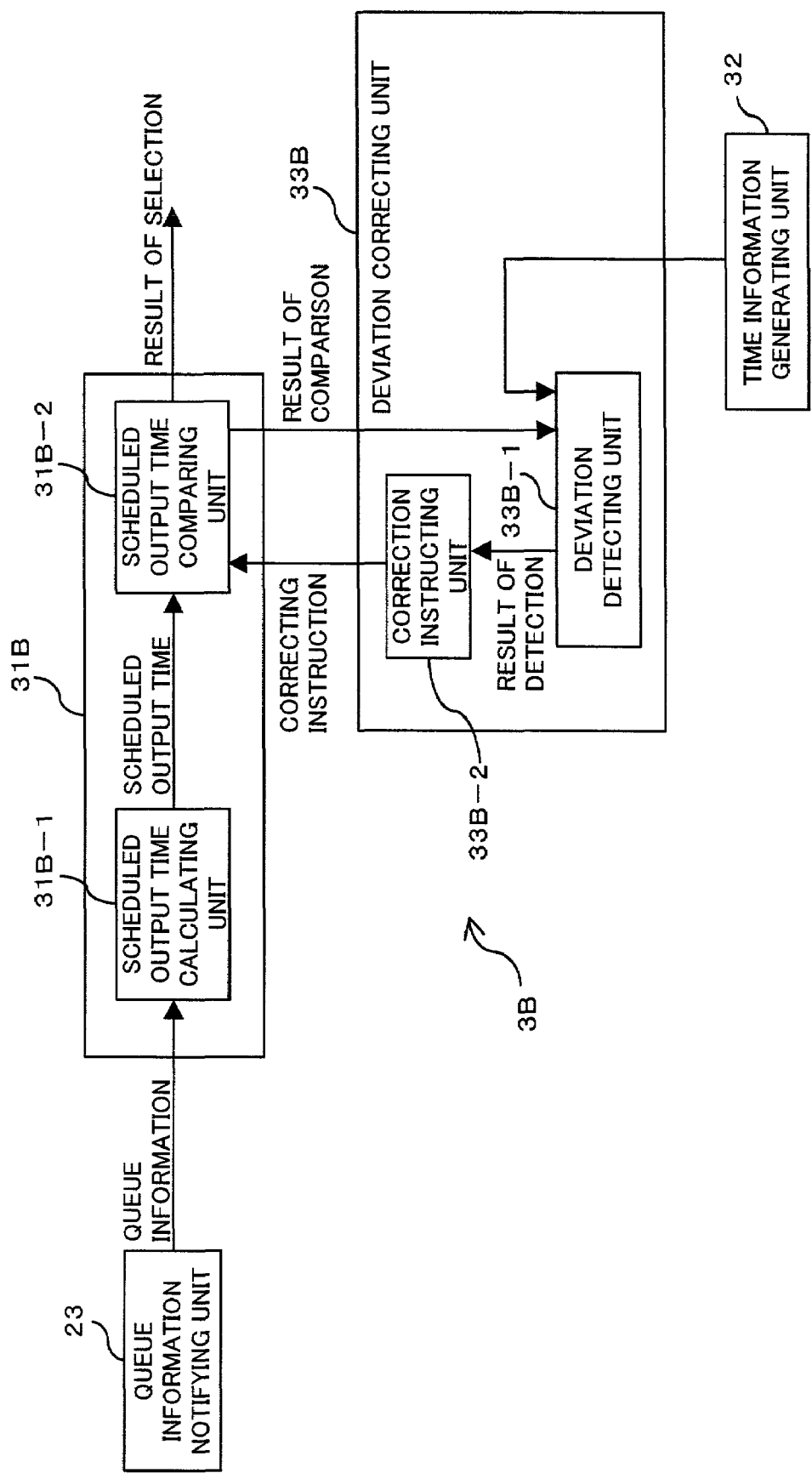
FIG. 11 is a block diagram showing a packet scheduler according to a second embodiment of the present invention.

FIG. 11 is a block diagram showing a packet scheduler 3B as a second embodiment of the present invention. Similarly to the above-described first embodiment (see arrangement attached with reference numeral 3), the packet scheduler 3B shown in FIG. 11 can be applied to the packet transferring apparatus shown in FIG. 2, whereby packet data pieces held in the queue blocks 22-1 to 22-n can be subjected to scheduling in accordance with the WFQ algorithm.

Also in the second embodiment, of the above queues 22-1 to 22-n, the operator is allowed to select a queue block to which the WFQ algorithm is not applied. In this case, the selected queue block is excluded from a group of queue blocks which will be subjected to the packet scheduling processing in accordance with the WFQ algorithm described later on.

The arrangement of the packet scheduler 3B as the second embodiment is different from the packet scheduler 3 as the above-described first embodiment in the following point. That is, when the deviation correcting unit 33B detects deviation of the scheduled output time information from the current time information and effects correction on the scheduled output time information, the scheduled output time information as the target of correction is different. The remaining portion of the arrangement is substantially similar to that of the first embodiment. In FIG. 11, like parts corresponding to those in FIG. 1 are identified by the same reference numerals.

That is, the deviation correcting unit 33B is arranged to include a deviation detecting unit (deviation detecting means) 33B-1 and a correction instructing unit (instructing means) 33B-2. A queue selection control unit (queue selecting means) 31B is arranged to include a scheduled output time calculating unit (scheduled output time calculating means) 31B-1 and a scheduled output time comparing unit (selecting means) 31B-2.

In this arrangement, the deviation detecting unit 33B-1 is a unit for detecting the deviation of each scheduled output time information calculated on a queue which is selected by the queue selection control unit 31B from the current time information. The correction instructing unit 33B-2 is a unit for providing instruction to the scheduled output time comparing unit 31B-2 so that the selection processing effected in the scheduled output time comparing unit 31B-2 is corrected in accordance with the deviation detected by the deviation detecting unit 33B-1.

According to the above-described arrangement of the packet scheduler 3 (see the arrangement denoted by reference 3) as the first embodiment, the deviation correcting unit 31 carries out necessary correction processing on the scheduled output time information of all of the queue blocks placed in the back-log state which are calculated by the scheduled output time calculating unit 31-1. Conversely, according to the arrangement of the packet scheduler 3B as the second embodiment, the necessary correction processing is effected on only the scheduled output time information that is calculated by a queue selected and controlled by the queue selection control unit 31B.

For example, when the scheduled output time comparing unit 31B-2 subjects the scheduled output time data calculated by the scheduled output time calculating unit 31B-1 for each queue block placed in the back-log state to a comparing operation, if a queue block 22-i having the scheduled output time data with the earliest time of output is selected, then the deviation detecting unit 33B-1 detects deviation of the scheduled output time data Fi created by calculation on the selected queue 22-i from the current time data.

In more concretely, the scheduled output time data with the earliest time of output, MinF is compared with a value of (Time+k) which derives from adding the current time data "Time" supplied from the time information generating unit 32 and permissible deviation value k together. Then, the result of comparison and determination is supplied to the correction instructing unit 33B-2 of the deviation correcting unit 33B.

In other words, the deviation detecting unit 33B-1 compares the scheduled time data with the earliest time of output, MinF (scheduled time data Fi of the selected queue block 22-i) with the current time data "Time+k" so as to determine whether the following Equation (3B) is satisfied or not. Then, the result of comparison and determination is supplied to the correction instructing unit 33B-2.

$$\text{Min}F \leq \text{Time}+k \qquad (3B)$$

If the deviation detecting unit 33B-1 finds a queue which does not satisfy the above Equation (3B) (i.e., the scheduled output time data of the queue exceeds the value of Time+k), then the scheduled output time comparing unit 31B-2 provides an instruction which prohibits a packet from being read from the queue block based on the WFQ algorithm, in accordance with the instruction issued by the correction instructing unit 33B-2. However, if there is any queue block which undergoes a packet transfer control based on other type of algorithm, the scheduled output time comparing unit 31B-2 provides an instruction that a packet is to be read from the queue block.

In other words, the correction instructing unit 33B-2 provides instruction that a packet to which the WFQ algorithm is applied is prevented from being read from a queue block, until deviation of the scheduled output time data with the earliest time of output selected by the scheduled output time comparing unit 31B-2 from the current time data falls within the permissible range "k". In this way, the selection processing effected by the scheduled output time comparing unit 31-2 can be corrected in an indirect manner.

As described above, with the correction processing effected by the deviation correcting unit 33B, it becomes possible to prevent the bit data indicating the calculated value of Fi from exceeding a predetermined constant time, and also prevent overflow from occurring, with the result that the scheduled output time comparing unit 31B-2 provided in the downstream stage can always select the scheduled output time data with the earliest time of output in a reliable and appropriate manner.

The packet scheduler 3B as the second embodiment of the present invention having the above-described arrangement can also be applied to the packet transferring apparatus shown in FIG. 2. In this case, the packet transferring processing can be fundamentally carried out based on the WFQ algorithm in a manner similar to that of the first embodiment. Now description will be hereinafter made with emphasis on a peculiar correction scheme of the scheduled output time data effected by the packet scheduler 3B as the second embodiment, with reference to a flowchart of FIG. 12.

Figure 12:
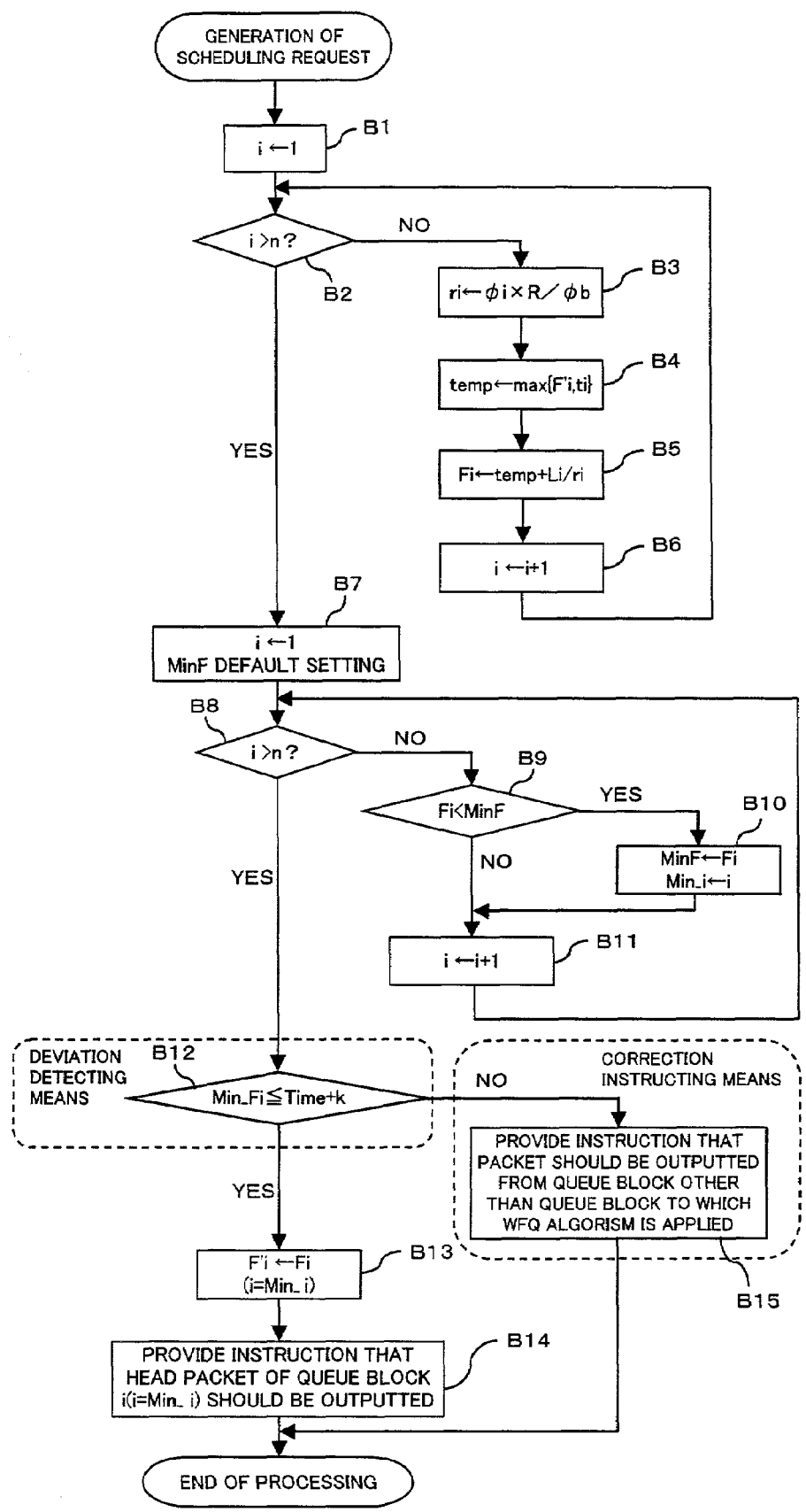
FIG. 12 is a flowchart for explaining an operation of the second embodiment of the present invention.

That is, as shown in the flowchart of FIG. 12, the scheduled output time calculating unit 31B-1 of the packet scheduler 3 calculates the scheduled output time of each queue block 22-i (i=1 to n) placed in the back-log state by using the above Equations (1) and (2) (step B1 to step B6). A variable temp appearing in steps B4 and B5 in FIG. 12 represents an auxiliary variable which is utilized in a calculation step of the above-described Equations (1) and (2) and temporarily stored in a memory unit.

The scheduled output time comparing unit 31B-2 is supplied with scheduled output time data of each queue block placed in the back-log state from the scheduled output time calculating unit 31B-1. The scheduled output time comparing unit 31B-2 selects a queue block having a packet of the scheduled output time data with the earliest time of output MinF (e.g., scheduled output time data Fi of a queue 22-i) from the respective scheduled output time data (step B7 to step B11).

The deviation detecting unit 33B-1 of the deviation correcting unit 33B compares the scheduled output time data MinF which is selected by the scheduled output time comparing unit 31B-2 as the scheduled output time with the earliest time of output, with the current time information defined by the above-described Equation (3B). In accordance with the result of the comparison, the deviation detecting unit 33B-1 determines whether or not the deviation of the calculated scheduled output time data from the current time falls in the permissible range (step B12). The result of determination based on comparison is supplied from the deviation detecting unit 33B-1 to the correction instructing unit 33B-2.

If the value of MinF satisfies the above-described Equation (3B)(YES route of step B12), the deviation detecting unit 33B-1 determines that the scheduled output time MinF falls within the permissible range, and then outputs the result of determination to the correction instructing unit 33B-2. In this case, the correction instructing unit 33B-2 provides to the scheduled output time comparing unit 31B-2 an instruction that correction is not carried out.

When the scheduled output time comparing unit 31B-2 receives the above instruction from the correction instructing unit 33B-2, in accordance with the instruction from the correction instructing unit 33B-2, the scheduled output time comparing unit 31B-2 stores the value of MinF (=Fi) as the scheduled output time F'i in the preceding step for the queue block 22-i in a memory unit not shown, whereby data for calculating the scheduled output time for the next step is prepared (step B13).

Thereafter, the identification number of the selected queue block 22-i is informed to the queue constructing unit 2. Thus, an instruction for reading a piece of packet data stored in the queue block 22-i is provided to the writing/reading control unit 21 (see FIG. 3) of the queue constructing unit 2 (step B14).

As described above, when the packet scheduler 3B carries out the scheduling processing and an instruction for reading the packet to be read is outputted, the head packet stored in the selected queue block 22-i is read and outputted from the packet outputting unit 4 to the network.

Conversely, if it is determined that the scheduled output time does not satisfy the aforementioned Equation (3B) (NO route of step B12), the deviation detecting unit 33B-1 determines that deviation of the calculated scheduled output time Fi from the current time does not fall within the permissible range. Then, the result of determination is supplied to the correction instructing unit 33B-2. If any queue block other than a queue block to which the WFQ algorithm is applied is placed in the back-log state, the correction instructing unit 33B-2 provides to the scheduled output time comparing unit 33B-2 an instruction that a packet data shall be read from the selected queue block, in accordance with the result of determination supplied from the deviation detecting unit 33B-1 (step B15).

In this way, the scheduled output time comparing unit 33B-2 provides an instruction that a piece of packet data shall be read from a queue block which is subjected to a reading control based on an algorithm other than the WFQ algorithm, to the writing/reading control unit 21. Accordingly, if the deviation of the selected scheduled output time data from the current time does not fall within the permissible range, the packet output from the queue block is halted. Then, a transmission bandwidth which is originally assigned to the packet transmission based on the WFQ algorithm and which becomes useless due to the packet transmission halt is again assigned to a packet transmission based on other type of algorithm.

That is, since the packet is prevented from being read from the queue block to which the WFQ algorithm is applied, the amount of scheduled output time data calculated by Equations (1) and (2) will not be increased (incremented). Therefore, it becomes possible to narrow the deviation width of the scheduled output time from the current time data.

As described above, according to the packet scheduler 3B as the second embodiment of the present invention, the deviation correcting unit 33B is arranged to correct the selection processing by halting the selection processing effected in the queue selection control unit 31B based on the current time information. Therefore, it becomes possible to ensure assignment of a vacant bandwidth in a fair manner while preventing erroneous operation deriving from deviation of a scheduled packet output time from the real time caused by a calculation error in the WFQ calculation.

That is, the correction instructing unit 33B-2 provides an instruction such that the selection processing effected by the scheduled output time comparing unit 31B-2 in the queue selection control unit 31B shall be halted, based on the deviation amount detected by the deviation detecting unit 33B-1. Thus, packet reading from a queue block to which the WFQ algorithm is applied is halted until deviation of the scheduled output time data with the earliest time of output from the current time data falls within the permissible range "k". In other words, the calculated scheduled output time data can be prevented from being increased, with the result that it becomes possible to avoid deviation of the scheduled output time from the current time.

(b2) Description of First Modification of Second Embodiment

Figure 13:
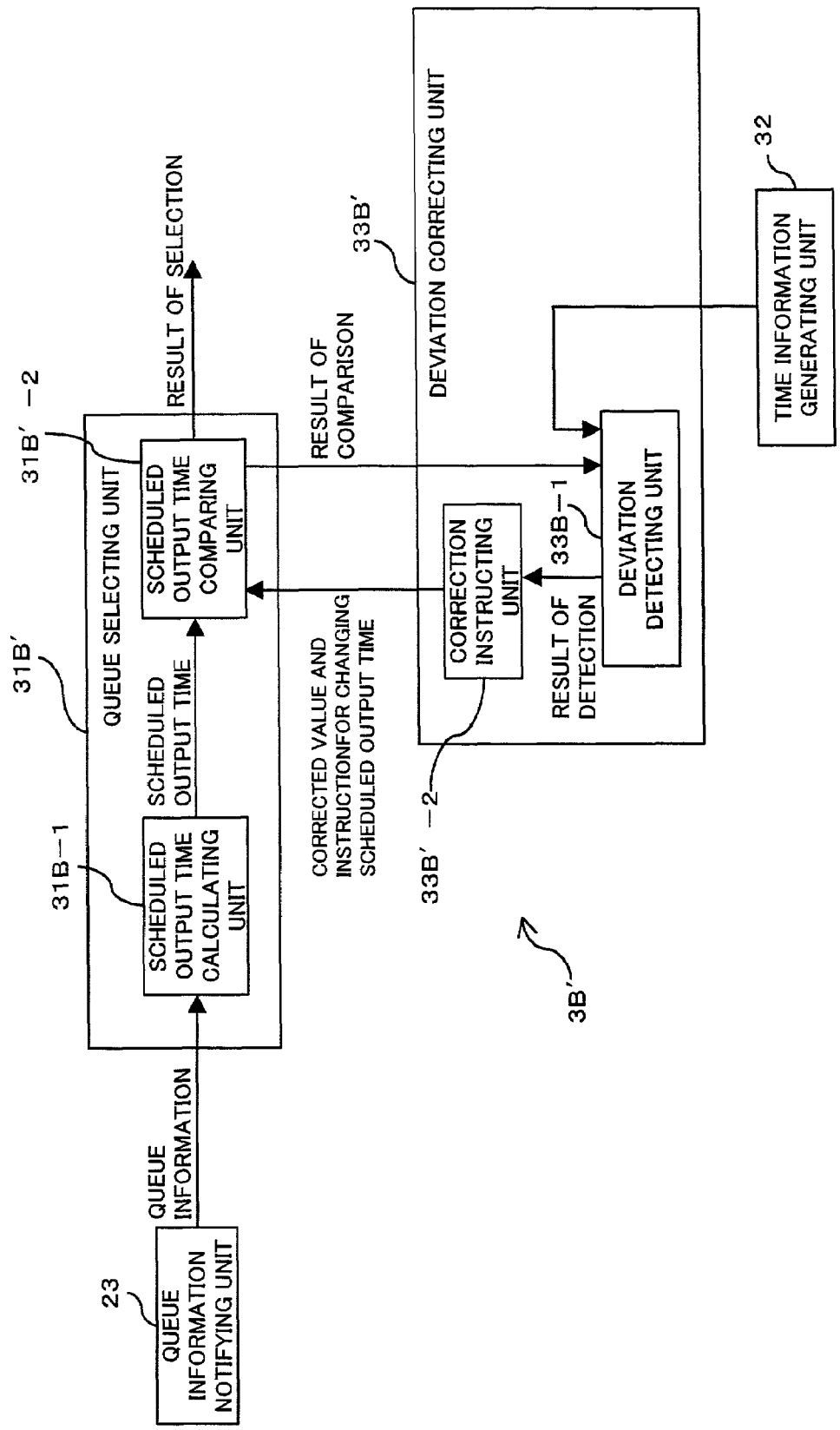
FIG. 13 is a block diagram showing a packet scheduler according to a first modification of the second embodiment of the present invention.

FIG. 13 is a block diagram showing an arrangement of a packet scheduler 3B' as a first modification of the second embodiment of the present invention. Unlike the above-described packet scheduler 3B as the second embodiment, the packet scheduler 3B' shown in FIG. 13 corrects all scheduled output time data of queue blocks including not selected queue blocks to which the WFQ algorithm is applied. Also, in the packet scheduler 3B', reading instruction is provided for packet data stored in a queue block selected by the scheduled output time comparing unit 31B'-2.

In other words, the correction instructing unit 33B'-2 of the deviation correcting unit 33B' is arranged to provide an instruction so that the scheduled output time comparing unit 31B'-2 corrects the scheduled output time information of each queue block serving as a reference of selection, in accordance with the deviation amount detected by the deviation detecting unit 33B-1.

In more concretely, if the deviation detecting unit 33B-1 determines that the deviation of the scheduled output time data Fi with the earliest time of output from the current time data "Time" supplied from the time information generating unit 32 does not fall within the permissible range "k", then the correction instructing unit 33B'-2 outputs a correction instruction to the scheduled output time comparing unit 31B'-2. In accordance with the correction instruction, the scheduled output time comparing unit 31B'-2 replaces the scheduled output time data of the all queue blocks to which the WFQ algorithm is applied with a value of "Time+k" indicative of the upper limit value of deviation. The scheduled output time comparing unit 31B'-2 notifies the queue constructing unit 2 of an identification number of a queue having the scheduled output time data with the earliest time of output that is selected in the preceding step. Thus, an instruction is made so that the head packet data stored in the queue block is read.

As described above, the packet scheduler 3B' as the first modification of the second embodiment is different from the aforementioned second embodiment in arrangement as follows. That is, the correction instructing unit 33B'-2 provides to the scheduled output time comparing unit 31B'-2 an instruction that correction should be made on the scheduled output time data of all queue blocks including the not selected queue block to which the WFQ algorithm is applied. Also, the scheduled output time comparing unit 31B'-2 provides an instruction that the packet data stored in the queue block selected in the preceding step should be read. The packet scheduler 3B' as the first modification of the second embodiment is operated in a manner substantially similar to that of the packet scheduler as the second embodiment in the remaining operations.

Figure 14:
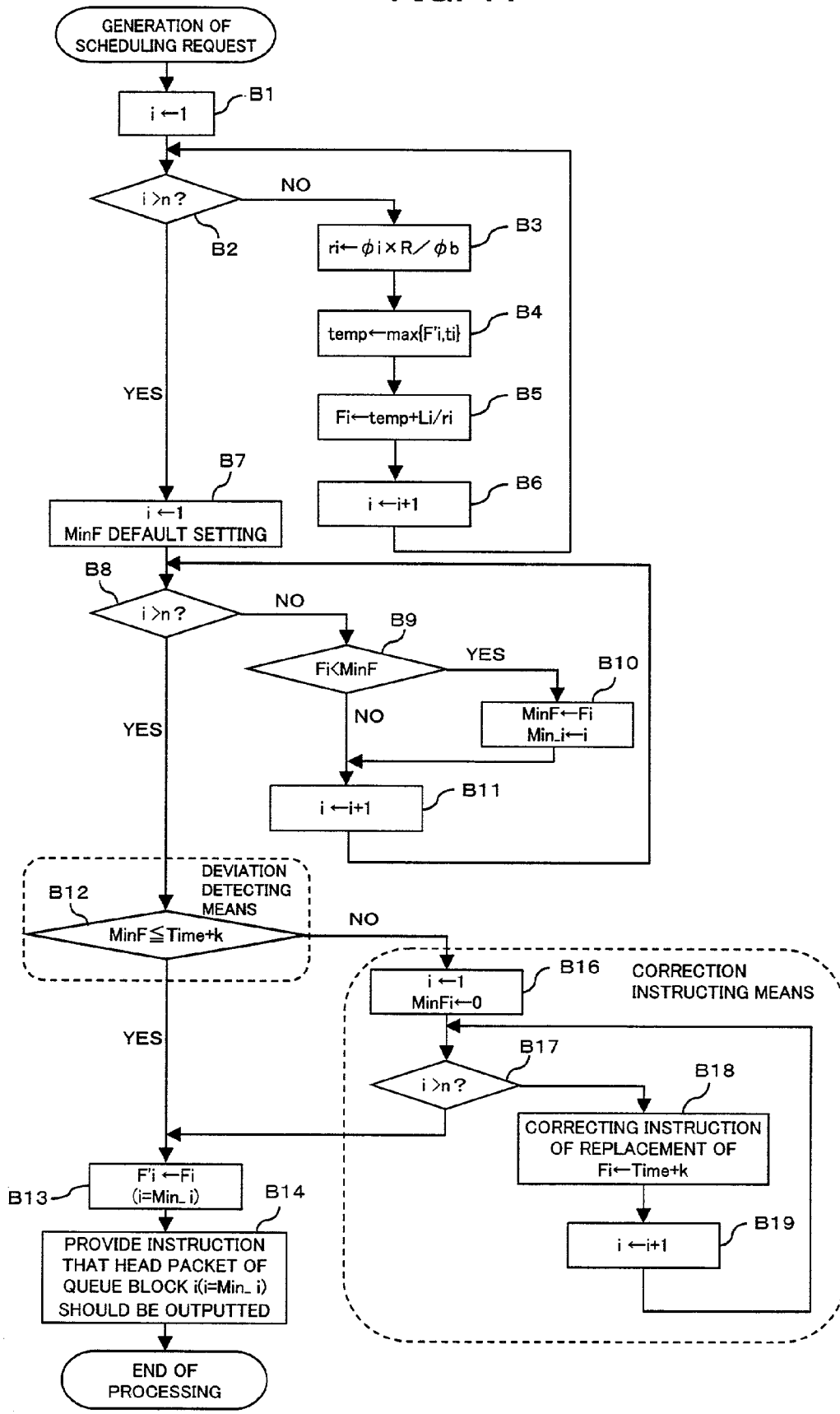
FIG. 14 is a flowchart for explaining an operation of the first modification of the second embodiment of the present invention.

Now, the operation of the first modification of the second embodiment according to the present invention will be hereinafter described with reference to FIG. 14. FIG. 14 is a flowchart for explaining the operation of the first modification of the second embodiment of the present invention. As shown in FIG. 14, if the deviation detecting unit 33B-1 determines that the value of MinF selected by the scheduled output time comparing unit 33B'-2 in the preceding step satisfies the aforesaid Equation (3B) (YES route of step B12), the correction instructing unit 33B'-2 provides to the scheduled output time comparing unit 31B-2 an instruction that no correction should be made.

When the scheduled output time comparing unit 31B'-2 receives the above instruction from the correction instructing unit 33B'-2, in accordance with the instruction from the correction instructing unit 33B'-2, the scheduled output time comparing unit 31B'-2 stores the value of MinF (=Fi) as the scheduled output time F'i in the preceding step for the queue block 22-i in a memory unit not shown for calculating the scheduled output time in the next step (step B13). Thereafter, the identification number of the selected queue block 22-i is informed to the queue constructing unit 2. Thus, an instruction for reading a piece of packet data stored in the queue block 22-i is provided to the writing/reading control unit 21 (see FIG. 3) of the queue constructing unit 2 (step B14).

Conversely, if the deviation detecting unit 33B-1 determines that the above Equation (3B) is not satisfied (NO route of step B12), the correction instructing unit 33-2 provides an instruction that the scheduled output data for all queue blocks to which the WFQ algorithm is applied including a queue block not selected should be replaced with the value of "Time+k" representing the upper limit of the permissible deviation (step B16 to B19).

The scheduled output time comparing unit 31B'-2 corrects the scheduled output time in accordance with the above-described correction instruction. Each piece of the corrected scheduled output time data is stored in a memory function not shown, for example, and thereafter the scheduled output time comparing unit 31B'-2 stores the value of MinF (=Fi) in a memory function not shown as the scheduled output time F'i of the queue block 22-i in the preceding step in accordance with the instruction provided from the correction instructing unit 33B'-2, whereby data for calculating the scheduled transmission time in the next step is prepared (step B13).

Thereafter, the identification number of the queue block 22-i which is selected in advance by the scheduled output time comparing unit 31B'-2 is informed to the queue constructing unit 2. Thus, an instruction for reading the head packet data stored in the queue block 22-i is provided to the writing/reading control unit 21 (see FIG. 3) of the queue constructing unit 2 (step B14).

In this way, also in the packet scheduler 3B' as the first modification of the second embodiment, the deviation correcting unit 33B' can correct the scheduled output time of all queue blocks to which the WFQ algorithm is applied, in accordance with the current time information. Therefore, similarly to the above-described first embodiment, it becomes possible to ensure assignment of a vacant bandwidth in a fair manner while preventing erroneous operation deriving from deviation of a scheduled packet output time from the real time caused by a calculation error in the WFQ calculation.

(b3) Description of Second Modification of Second Embodiment

Figure 15:
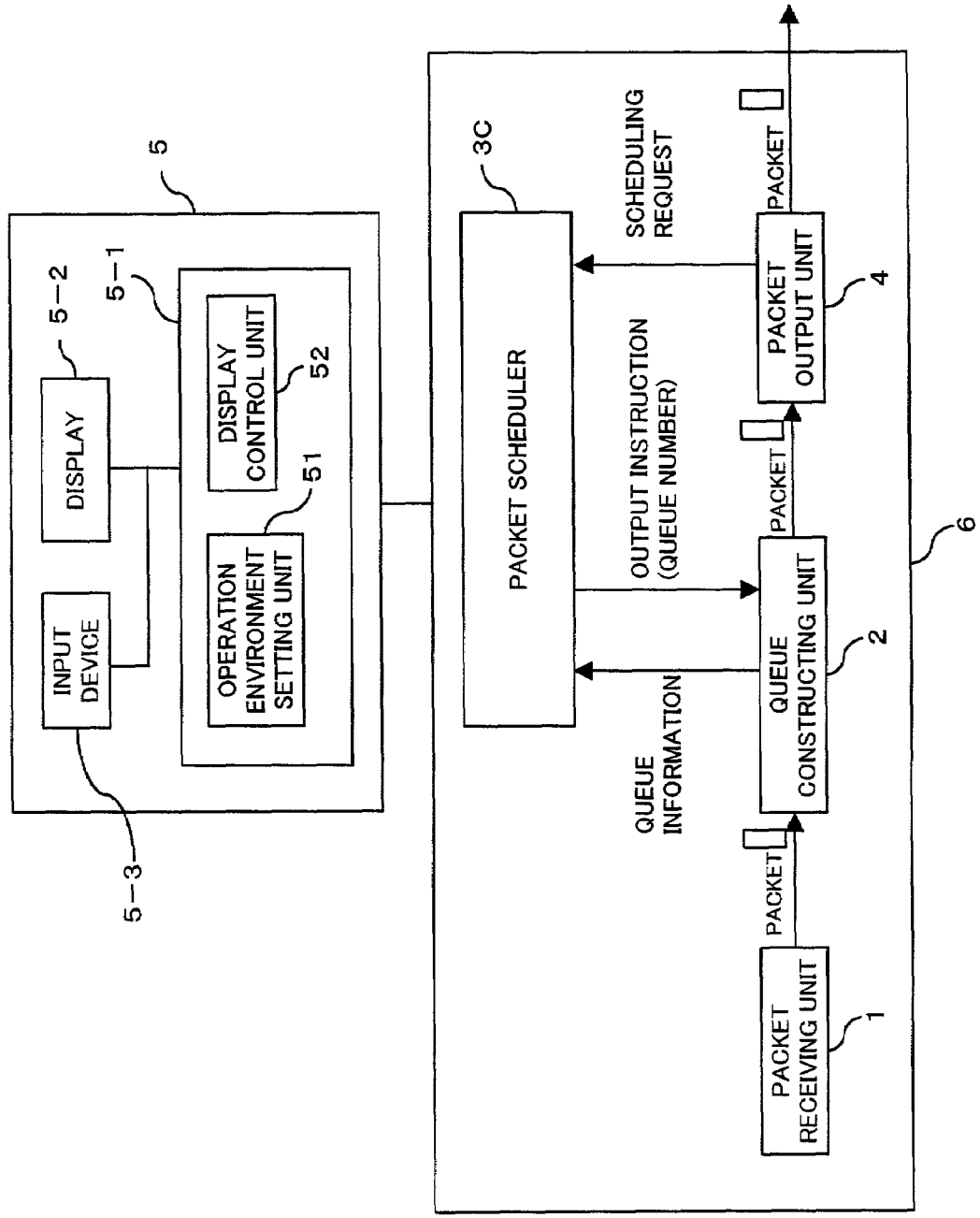
FIG. 15 is a block diagram showing a second modification of the second embodiment of the present invention.

FIG. 15 is a block diagram showing a packet transferring apparatus 6 to which the packet scheduler 3C is applied as a second modification of the second embodiment of the present invention. As shown in FIG. 15, the packet transferring apparatus 6 is arranged to include a packet scheduler 3C. This packet scheduler 3C can function as the packet scheduler (see reference numeral 3) in the packet transferring apparatus shown in FIG. 2. Therefore, this packet scheduler 3C may be made up of either of the packet scheduler 3B shown in FIG. 11 or the packet scheduler 3B' shown in FIG. 13.

Further, the packet transferring apparatus 6 is connected with a workstation 5 as an operation environment monitoring apparatus for allowing an operator to confirm or set an operation environment of the packet transferring apparatus 6. The workstation 5 is arranged to include a control unit 5-1, a display 5-2, an input device 5-3 such as a keyboard, a mouse and so on.

The control unit 5-1 is arranged to have at least a memory function not shown capable of storing therein data, a program or the like and a control function capable of executing a computer program stored in the memory function. Further, the control unit 5-1 is arranged to include an operation environment setting unit 51 and a display control unit 52.

The operation environment setting unit 51 is a unit for setting the operation environment. In more concretely, the operation environment setting unit 51 is a unit for allowing the operator to set a selection of valid mode or invalid mode of deviation correction processing effected by the deviation correcting unit in the packet scheduler 3C. The display control unit 52 is a unit for controlling the state of operation of the workstation 5. In more concretely, the display control unit 52 is a unit for controlling the display 5-2 so that the display 5-2 displays the state of deviation correction effected by the packet scheduler 3C in a proper manner.

The operation environment setting unit 51 of the control unit 5-1 is arranged to have a function (deviation correction environment setting function) for allowing the operator to select a valid mode in which the deviation correcting operation carried out by the above-described packet scheduler 3B' shown in FIG. 13 is valid or an invalid mode in which the same operation is invalid. The operation environment setting unit 51 also has a function for allowing the operator to set the allowance value "k" utilized when the deviation detecting unit 33B'-1 detects the deviation of the scheduled output data from the current time (deviation upper limit value setting function). The display control unit 52 is arranged to have a function for controlling the width of deviation of the scheduled output time from the current time data detected by the deviation detecting unit 33B'-1 (deviation width display function).

Figure 16:
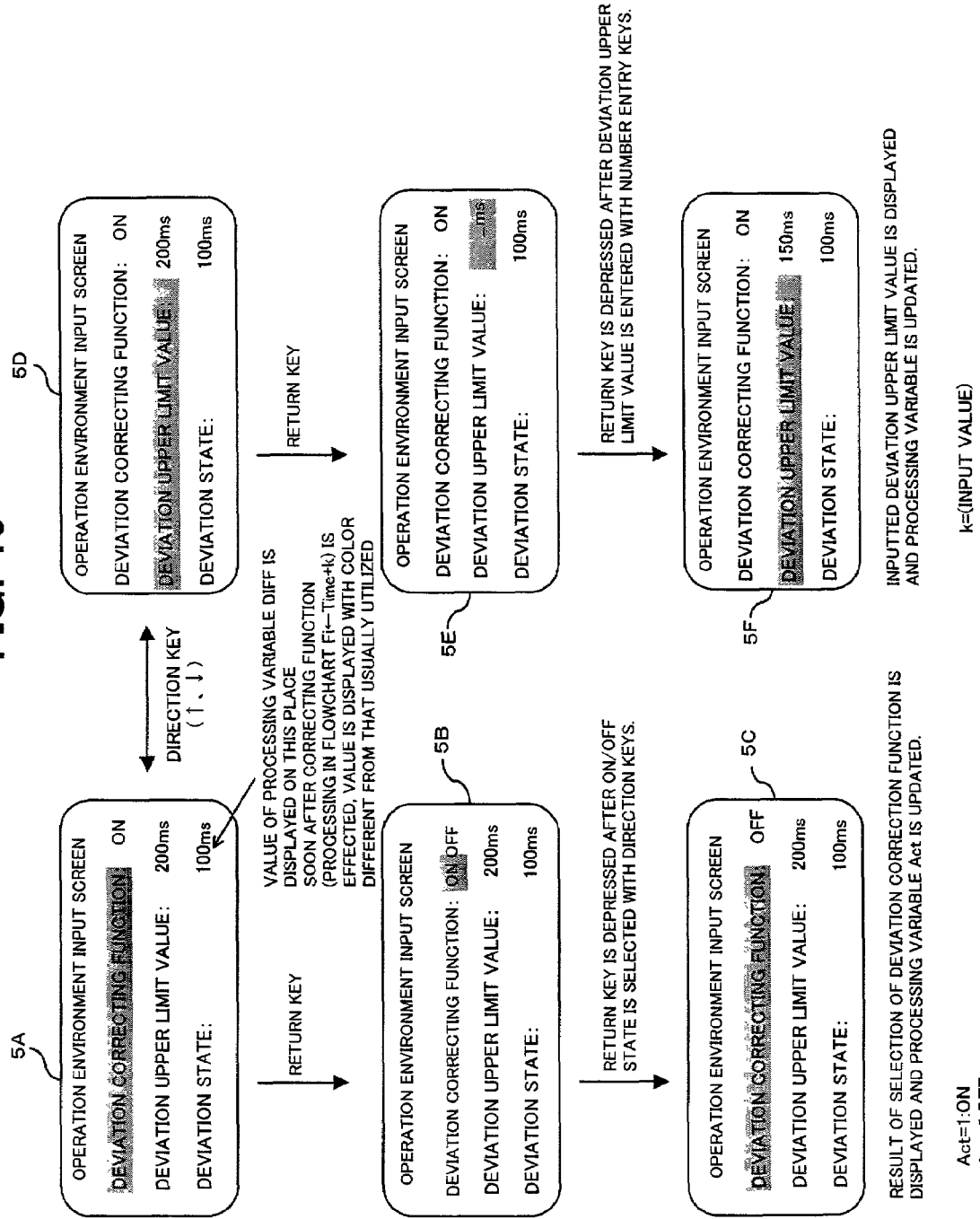
FIG. 16 is a set of diagrams each illustrative of an example of display screen of a workstation of the second modification of the second embodiment of the present invention.

Meanwhile, owing to the above-described respective functions of the control unit 5-1, the display 5-2 can creates a display screen as shown in FIG. 16, for example.

That is, when the operator accesses the workstation 5 as a function unit for setting the operation environment of the packet scheduler 3C, the operator can make the display control unit 52 control the display 5-2 so that the display 5-2 creates display screens as shown in diagrams 5A to 5F of FIG. 16, for example, depending on the operation state thereof.

As shown in data input screens, or the diagrams 5A to 5F of FIG. 16, each screen for inputting data of operation environment of the packet scheduler 3C is composed of four lines of indications. That is, the first line (top line) indicates a title of the display setting screen. The second line is an indication for setting the above-described deviation correction environment. In ordinary case, this indication denotes a status of deviation correction environment currently set. The third line is an indication for inputting data for use in the upper limit deviation value setting function. In ordinary case, this indication denotes a currently settled value of the upper limit deviation. Further, the fourth line, or the lowest line is an indication for inputting data of deviation width (deviation value) for use in the deviation width display function.

When the operator wants to change the set value indicated on the second to third lines from the highest line of the data input screens 5A to 5F, the operator may operate direction keys not shown provided on the keyboard 5-3 so that desired setting can be designated. When an indication for setting data is designated, the designated indication is displayed in the reversed manner. For example, in the data input screen 5A, an indication "deviation correction function" is displayed in the reversed manner, whereby the operator is allowed to input data by means of the deviation correction environment setting function. Further, in the data input screen 5D, an indication "deviation upper limit value" is displayed in the reversed manner, whereby the operator is allowed to input data by means of the deviation upper limit value setting function.

At this time, if the deviation correction environment setting function is selected (see the data input screen 5A), and a return key (not shown) of the keyboard 5-3 is depressed, then as shown in the data input screen 5B, a display screen is created so that the operator can select the valid mode ("on") or the invalid mode ("off") of the deviation correcting function. At this state, the operator selects the reversed display portion of "on" or "off" by using the direction keys on the keyboard 5-3, and thereafter depresses the return key. Thus, the deviation correction environment can be settled. In the data input screen 5C, a setting status is displayed in which mode selection is made from the valid mode ("on") to the invalid mode ("off").

Similarly, if the deviation upper limit value setting function is selected (see the data input screen 5D), and a return key (not shown) of the keyboard 5-3 is depressed. Then as shown in the data input screen 5E, a display screen is created in which the operator can input the deviation upper limit value. At this state, the operator inputs the deviation upper limit value by using number entry keys on the keyboard 5-3, and thereafter depresses the return key. Thus, the deviation upper limit value "k" can be settled. In the data input screen 5F, a setting status is displayed in which the deviation upper limit value is changed from 200 ms (millisecond) to 150 ms (millisecond).

If new data of operation environment setting is inputted to the packet transferring apparatus 6 by means of the workstation 5 as described above, the packet transferring apparatus 6 updates its operation environment in accordance with the new setting and carries out packet transfer processing based on the updated operation environment.

As for the deviation width indicated on the fourth line of the data input screens 5A to 5F, if correction is made on the deviation width by the function of the packet scheduler 3C, the deviation value soon after the correction is displayed with a color different from a color usually utilized. In this way, display is made with emphasis on the fact that the deviation correction function is effected.

How the second modification of the second embodiment according to the present invention having the arrangement described above is operated will be hereinafter described with reference to flowcharts of FIGS. 17 and 18.

The packet transferring apparatus 6 having the packet scheduler 3C as the second modification of the second embodiment applied thereto is operated under either of the two types of environments, depending on the setting of the deviation correction environment setting function made by the workstation 5 as the operation environment setting monitoring apparatus. That is, the packet transferring apparatus 6 is operated under the environment in which the deviation correcting operation is effected as described in detail with the first modification of the second embodiment (see FIGS. 13 and 14) or the environment in which the deviation correcting operation is not effected as described in detail with the second embodiment (see FIGS. 11 and 12).

Figure 17:
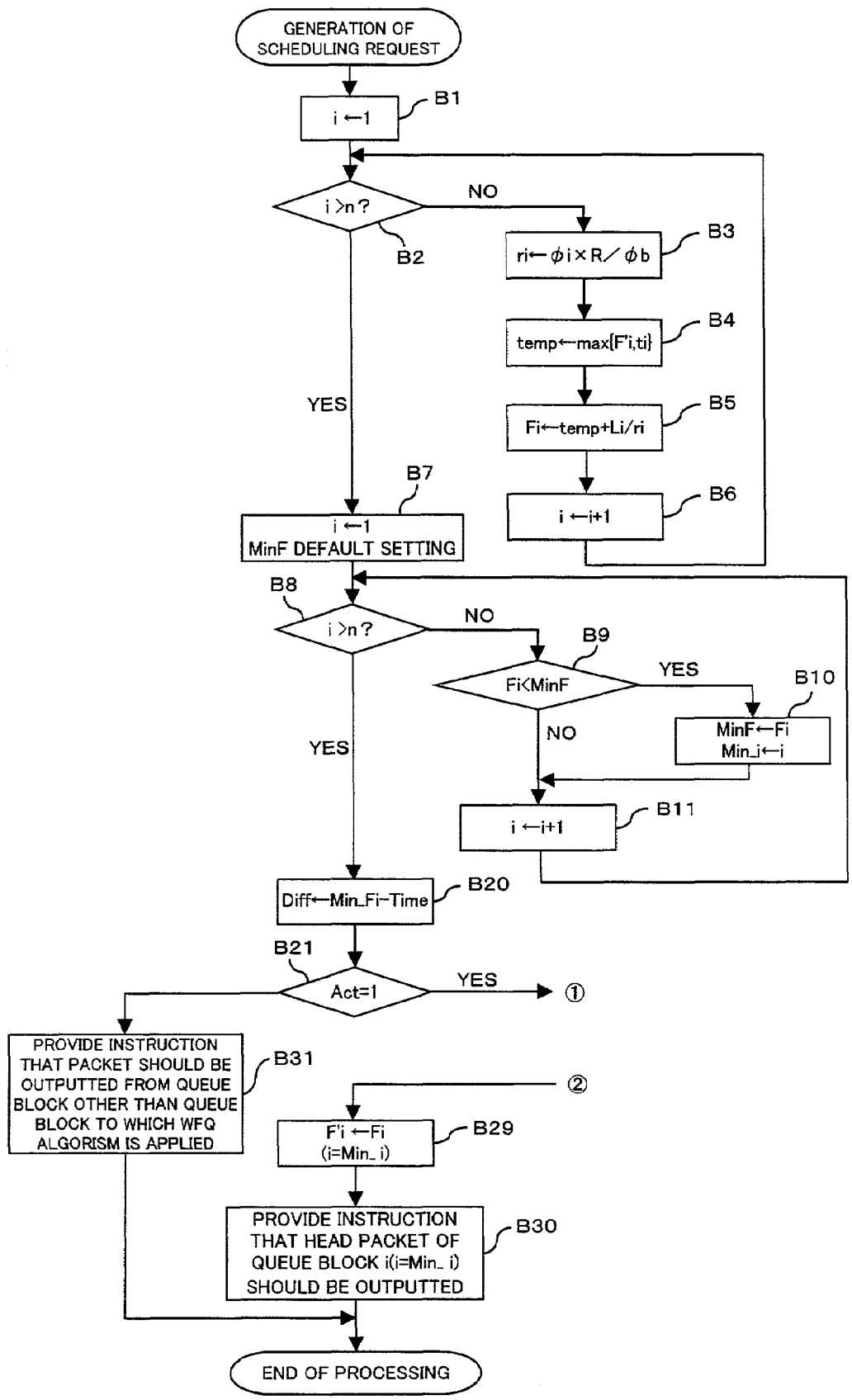
FIG. 17 is a part of a flowchart for explaining an operation of the second modification of the second embodiment of the present invention.

The packet transferring apparatus 6 as the second modification of the second embodiment is operated in the same manner as that of the packet scheduler 3B' shown in FIG. 13, if the processing thereof stays in the preparatory steps in which the deviation correction is effected (steps B1 to B11 in FIG. 17). That is, the processing of the packet transferring apparatus 6 includes the processing of calculating the scheduled output time data effected by the scheduled output time calculating unit 31B-1 shown in FIG. 13 and processing for selecting the scheduled output time data with the earliest time of output effected by the scheduled output time comparing unit 31B'-1 in the preparatory steps for detecting the deviation.

In other words, also in the packet scheduler 3C, the scheduled output time calculating unit calculates the scheduled output time for each queue block placed in the back-log state. Thereafter, the scheduled output time comparing unit selects the scheduled output time with the earliest time of output from the all calculated scheduled output times. These steps of processing are common to those of the above-described packet schedulers 3B and 3B' shown in FIG. 11 or FIG. 13.

When the scheduled output time comparing unit selects the scheduled output time with the earliest time of output, the workstation 5 is brought into a mode in which the deviation width display function is effected by the display control unit 52. Thus, the display 5-2 creates a display screen on which difference Diff (=MinF−Time) between the selected output time with the earliest time of output and the current time data Time supplied from the time information generating unit 32 is displayed (step B20).

Figure 18:
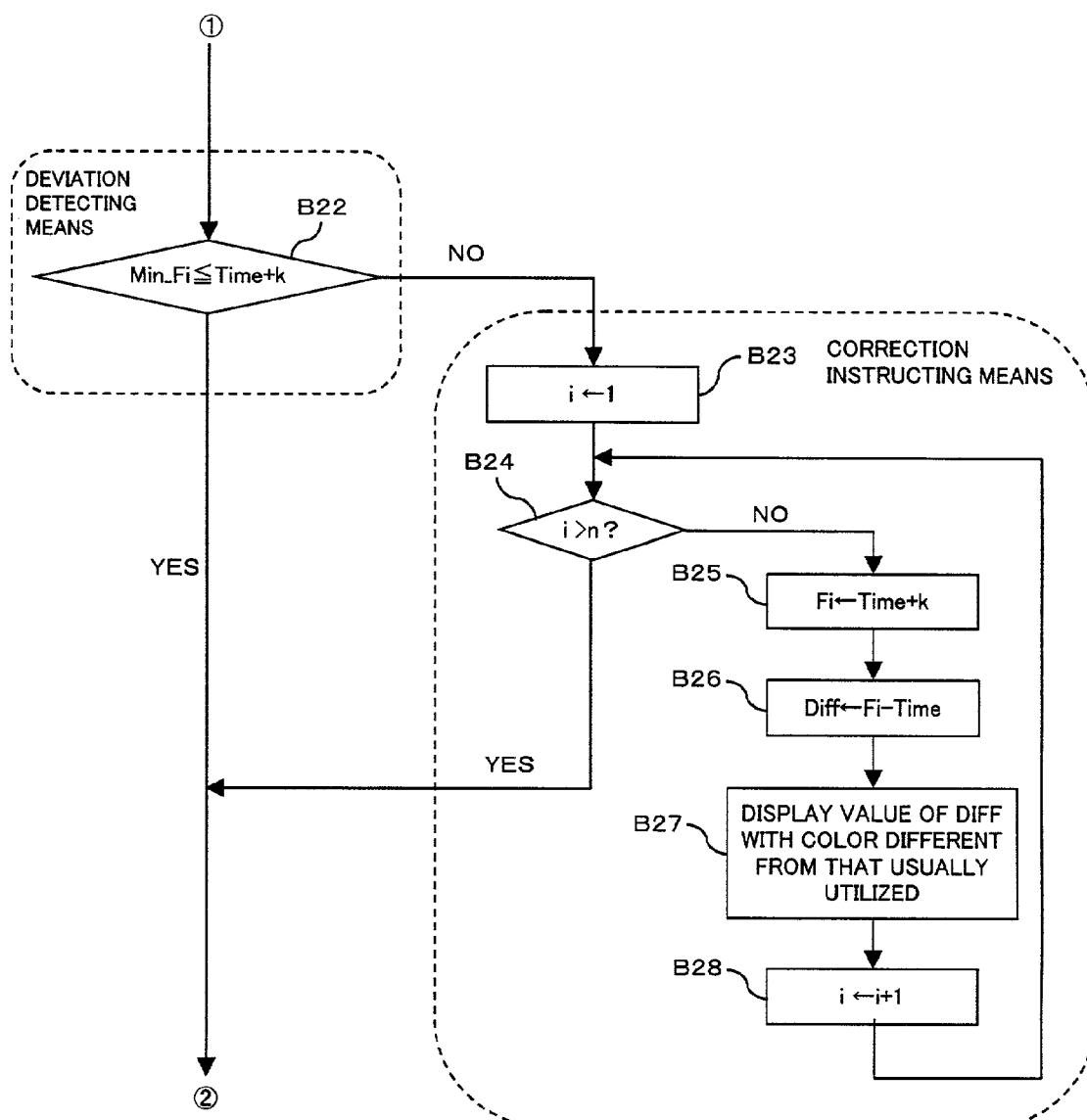
FIG. 18 is another part of the flowchart continuous to that of FIG. 17 for explaining an operation of the second modification of the second embodiment of the present invention.

Successively, if the deviation correction function is set to the valid mode in accordance with the setting of the deviation correction environment setting function of the operation environment setting unit 51 (Act=1), the deviation correction processing is carried out in a manner similar to that of the above-described packet scheduler 3B' shown in FIG. 13 (YES route of step B21 steps B22 to B28 in FIG. 18). In other words, if the deviation correcting function is made effective, the packet scheduler 3C is operated in a manner similar to that of the above-described packet scheduler 3B' shown in FIG. 13.

At this time, if the deviation detecting unit 33B-1 of the packet scheduler 3C detects that deviation of the selected output time with the earliest time of output MinF from the current time data "Time" supplied from the time information generating unit 32 does not fall within the permissible range "k" (NO route of step B22), the correction instructing unit 33B'-2 provides an instruction that the scheduled output time data of all queue blocks including not selected queues to which the WFQ algorithm is applied should be replaced with the deviation upper limit value "Time+k" (steps B23 to B25, B28). The above permissible range "k" is entered by means of the deviation upper limit setting function of the operation environment setting unit 52.

As described above, during the step of correction in which the scheduled output time data of all queue blocks having the WFQ algorithm applied, the scheduled output time data selected as one with the earliest time of output is also corrected. Therefore, the value of deviation width Diff displayed on the display unit 5-2 by the deviation width display function is updated to the value of the deviation upper limit value "k" (step B26). At this time, the deviation value Diff (=k) soon after the correction operation is displayed with a color different from a color usually utilized.

Thus, display is made with emphasis on that the deviation correction function is effected (step B27).

In this way, when all of the scheduled output time data is corrected, in accordance with the instruction from the correction instructing unit 33B'-2, the scheduled output time comparing unit 31B'-2 stores the value of MinF (=Fi) as the scheduled output time F'i in the preceding step for the queue block 22-i in a memory unit not shown for calculating the scheduled output time in the next step (step B29). Thereafter, the identification number of the selected queue block 22-i is informed to the queue constructing unit 2. Thus, an instruction for reading a piece of packet data stored in the queue block 22-i is provided to the writing/reading control unit 21 (see FIG. 3) of the queue constructing unit 2 (step B30).

Further, under the condition that the deviation correction function is effective, if the value of the scheduled output time data with the earliest time of output MinF satisfies the above Equation (3B) (YES route of step B22), the correction instructing unit 33B'-2 does not provide an instruction as described above to the scheduled output time comparing unit 31B'-2, but the correction instructing unit 33B'-2 provides an instruction that the head packet having the scheduled output time data MinF held in the queue block should be subjected to the processing for output (steps B29, B30).

Furthermore, if the deviation correction function is set to the invalid mode, the packet scheduler 3C is operated in a manner similar to that of the packet scheduler 3B shown in FIG. 11. That is, if any queue block other than queue blocks to which the WFQ algorithm is applied is placed in the back-log state, the correction instructing unit 33-2 provides to the scheduled output time comparing unit 33B-2 an instruction that packet data shall be read from the queue block (step B31), and the above-described deviation correction processing is not carried out.

As described above, also in the second modification of the second embodiment according to the present invention, similarly to the case of the above-described first embodiment, it becomes possible to realize guarantee in bandwidth assignment and fair vacant bandwidth assignment while preventing erroneous operation deriving from deviation of a scheduled packet output time from the real time caused by a calculation error in the WFQ calculation. Moreover, the operator can selectively set the valid mode or invalid mode of the deviation correction processing by means of the operation environment setting unit 51 of the workstation 5 as the operation environment setting monitoring apparatus, depending on the necessity of the deviation correction processing upon managing the apparatus. Accordingly, the apparatus can be operated under the optimum environment, with the result that it is convenient for the operator to manage the apparatus.

Meanwhile, when the workstation 5 as the operation environment setting apparatus as the second modification of the second embodiment as described above is operated in respective functions, the workstation 5 may be operated in accordance with a computer program which is stored in a storage medium such as CD-ROM or the like. That is, when the packet transferring apparatus 6 is operated, the workstation 5 may dynamically access the program stored in the storage medium to read the program and carry out the functions of the workstation 5.

(C) Other Disclosure

Each function of the packet scheduler as the above-described respective embodiments may be implemented by any of a hardware, a firmware, a software or a combination thereof.

While several embodiments and modifications have been described above, the present invention is not limited to these embodiments but various changes and modifications other than the above embodiments can be effected without departing from the gist of the present invention.

What is claimed is:

1. A packet scheduler in which management is made on output awaiting packets stored in a plurality of queue blocks each of which has a weighting coefficient settled based on an output guaranteeing bandwidth, whereby an output order for the head packets stored in respective queue blocks is decided, the packet scheduler comprising:

queue control means for controlling selection of a queue block having a packet to be sent at the highest priority stored therein, based on scheduled output time information obtained by calculation using management information of the output awaiting packets and the weighting coefficient of each queue block, and correcting means for correcting processing carried out in the queue control means, correcting said scheduled time within the current time plus allowable excess time if said schedule time was larger than said current time plus allowable excess time, based on the current time information.

2. A packet scheduler according to claim 1, wherein the queue control means is arranged to comprise scheduled output time calculating means for calculating a scheduled output time of a packet stored in each of the queue blocks placed in a back-log state by using management information of the output awaiting packets and the weighting coefficient settled for each of queue blocks placed in a back-log state, and selecting means for selecting a queue block having a packet to be sent at the highest priority stored therein based on each scheduled output time information deriving from calculation effected by the scheduled output time calculating mean.

3. A packet scheduler according to claim 2, wherein the correcting means is arranged to include deviation amount detecting means for detecting deviation amount of the scheduled output time information calculated on the queue selected and controlled by the queue control means from the current time information, and instructing means for providing to the selecting means an instruction that selection processing carried out by the selecting means should be corrected in accordance with the deviation amount detected by the deviation amount detecting means.

4. A packet scheduler according to claim 3, wherein the instructing means is arranged to provide to the selecting means instruction that the scheduled output time information created for each queue block as a reference of selection should be corrected in accordance with the deviation amount detected by the deviation amount detecting means.

5. A packet scheduler according to claim 1, further comprising time information acquiring means supplied with management information useful for managing output awaiting packets stored in respective queue blocks together with the current time information, thereby making it possible for the time information acquiring means to acquire the current time information through the management, information, wherein the correcting means is arranged to correct the processing effected in the queue control means in accordance with the current time information acquired by the time information acquiring means.

6. A packet scheduler according to claim 2, wherein
the correcting means is arranged to include deviation amount detecting means for detecting deviation amount at the scheduled output time information calculated by the scheduled output time calculating means from the current time information, and instructing means for providing to the selecting means instruction that selection processing carried out by the selecting means should be corrected in accordance with the deviation amount detected by the deviation amount detecting means.

7. A packet scheduler according to claim 2, wherein
the correcting means is arranged to include doviation amount detecting means for detecting deviation amount of a value of an intermediate parameter deriving from any calculation step effected in the scheduled output time calculating means from the current time information, and instructing means for providing to the selecting means an instruction that selection processing carried out by the selecting means should be corrected in accordance with the deviation amount detected by the deviation amount detecting means.

8. A packet scheduler according to claim 3, wherein the instructing means halts the selection processing effected in the selecting means depending on the deviation amount detected by the deviation amount detecting means.

9. An operation environment setting monitoring apparatus for setting the operation environment of a packet scheduler and monitoring the packet scheduler, the packet scheduler being arranged for managing output awaiting packets stored in a plurality of queue blocks each of which has a weighting coefficient settled based on an output guaranteeing bandwidth, whereby an output order for the head packets stored in respective queue blocks is decided, the packet scheduler also comprising queue control means for controlling selection of a queue block having a packet to be sent at the highest priority stored therein, based on scheduled output time information obtained by calculation using management information of the output awaiting packets and the weighting coefficient of each queue block and correcting means for correcting processing carried out in the queue control means based on the current time information, the operation environment setting monitoring apparatus comprising:

an operation environment setting unit for allowing a user to set a valid/invalid status of the correction processing effected by the correcting means, and a display control unit for displaying and controlling the status and operation of the deviation correction effected in the packet scheduler.

* * * * *